March 6, 1962
A. M. NELSON ETAL
3,023,895
CARD PROCESSING SYSTEM
Filed Aug. 26, 1957
6 Sheets-Sheet 3
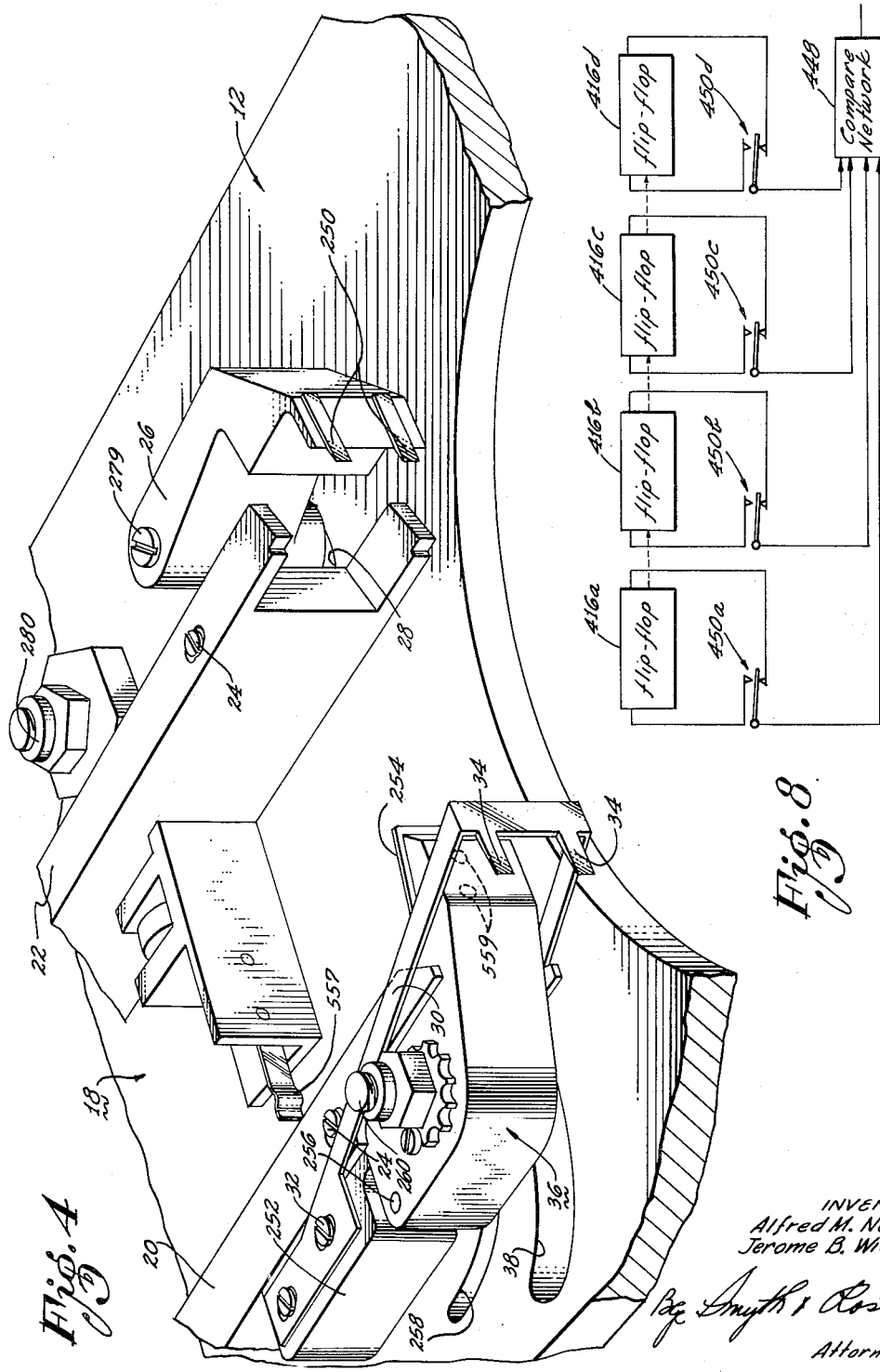
INVENTORS:
Alfred M. Nelson
Jerome B. Wiener
By Smyth & Roston
Attorneys

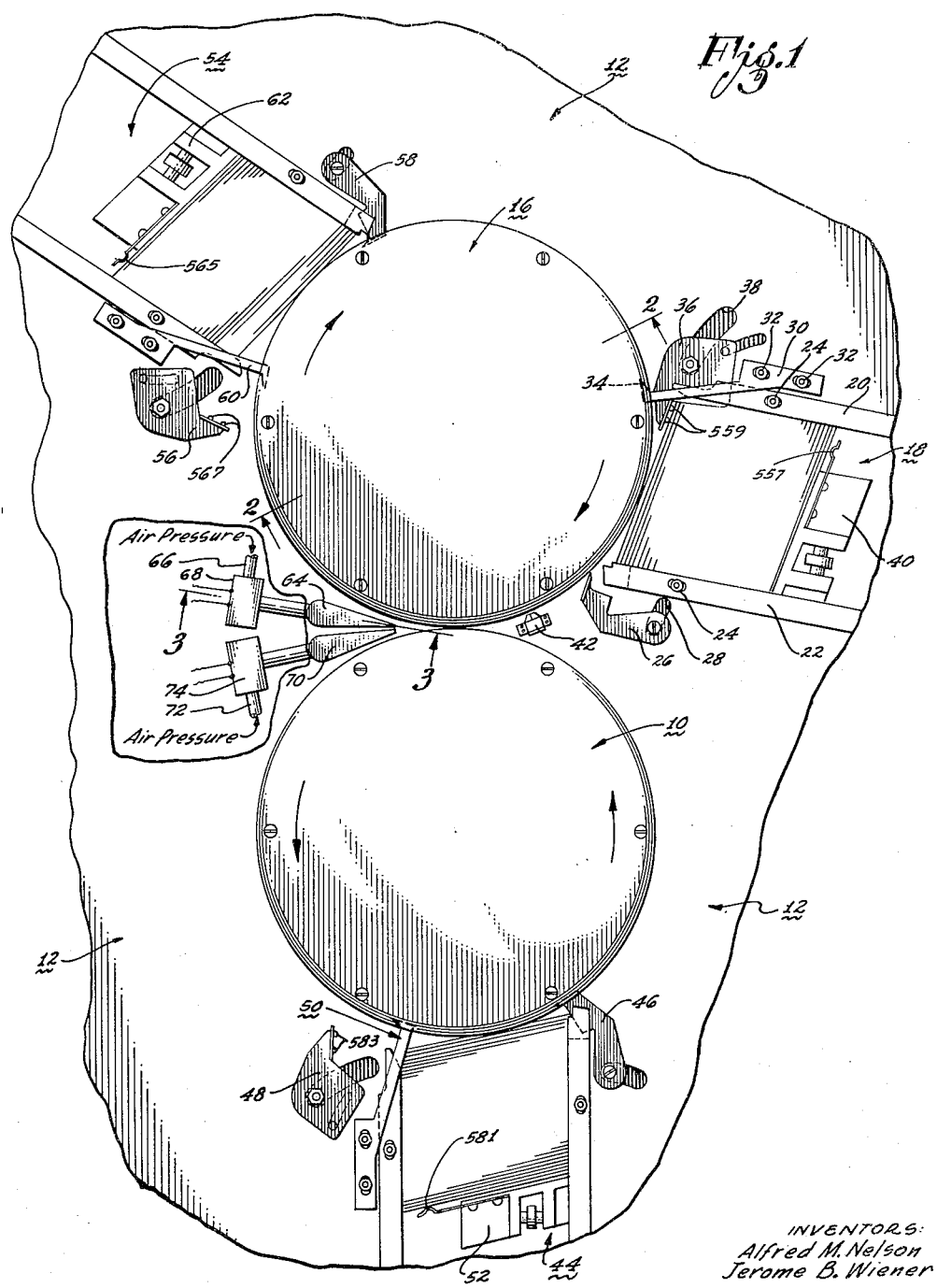

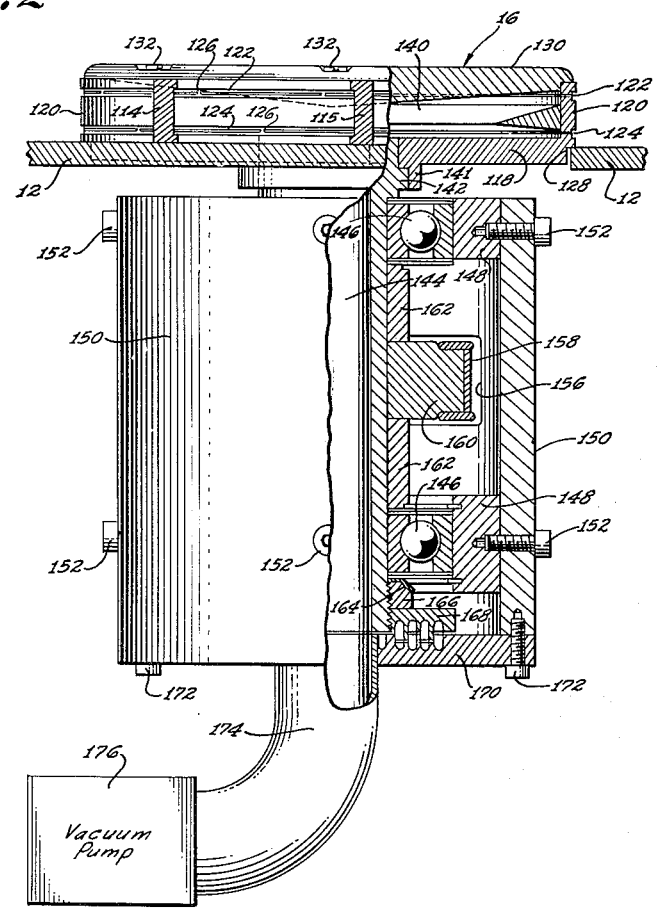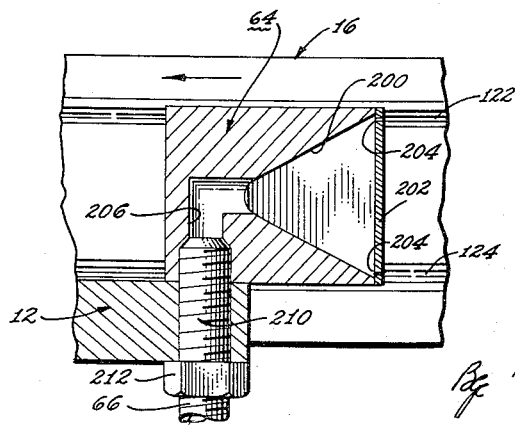

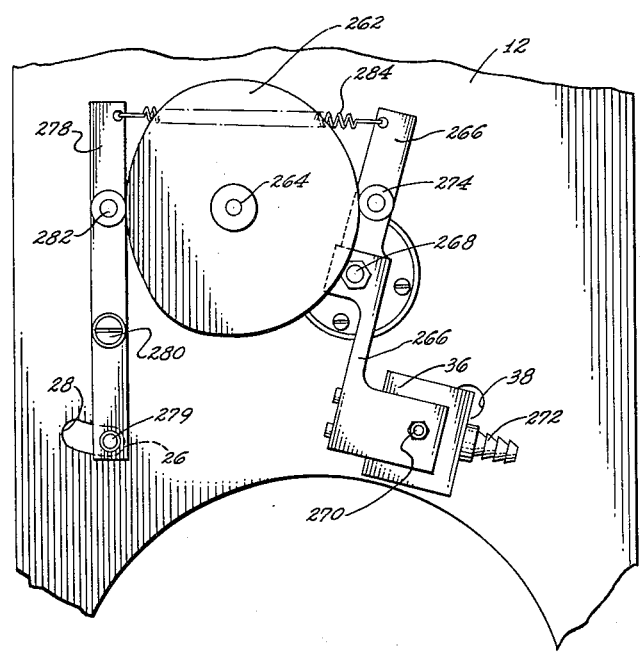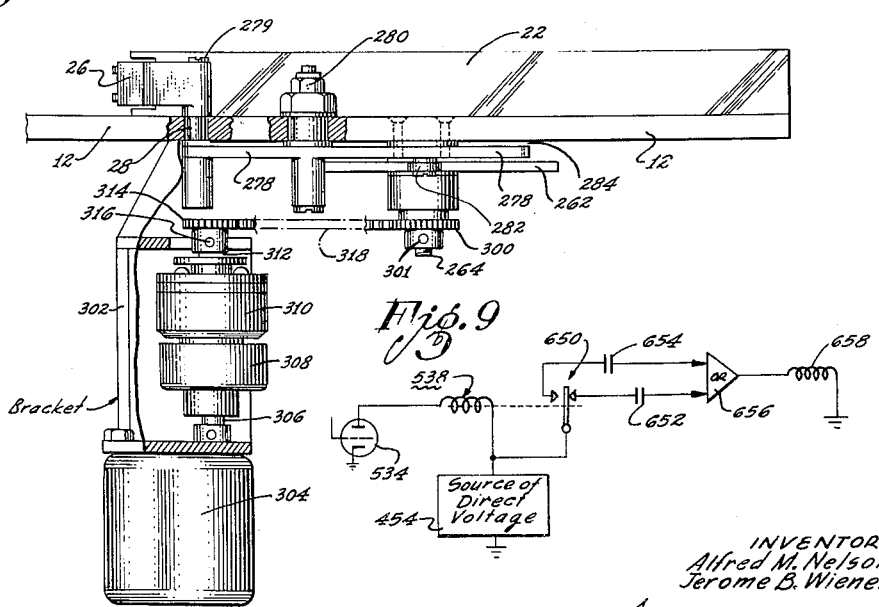

March 6, 1962

A. M. NELSON ETAL 3,023,895

CARD PROCESSING SYSTEM

Filed Aug. 26, 1957

INVENTORS:
Alfred M. Nelson
Jerome B. Wiener

By Smyth & Roston

Attorneys

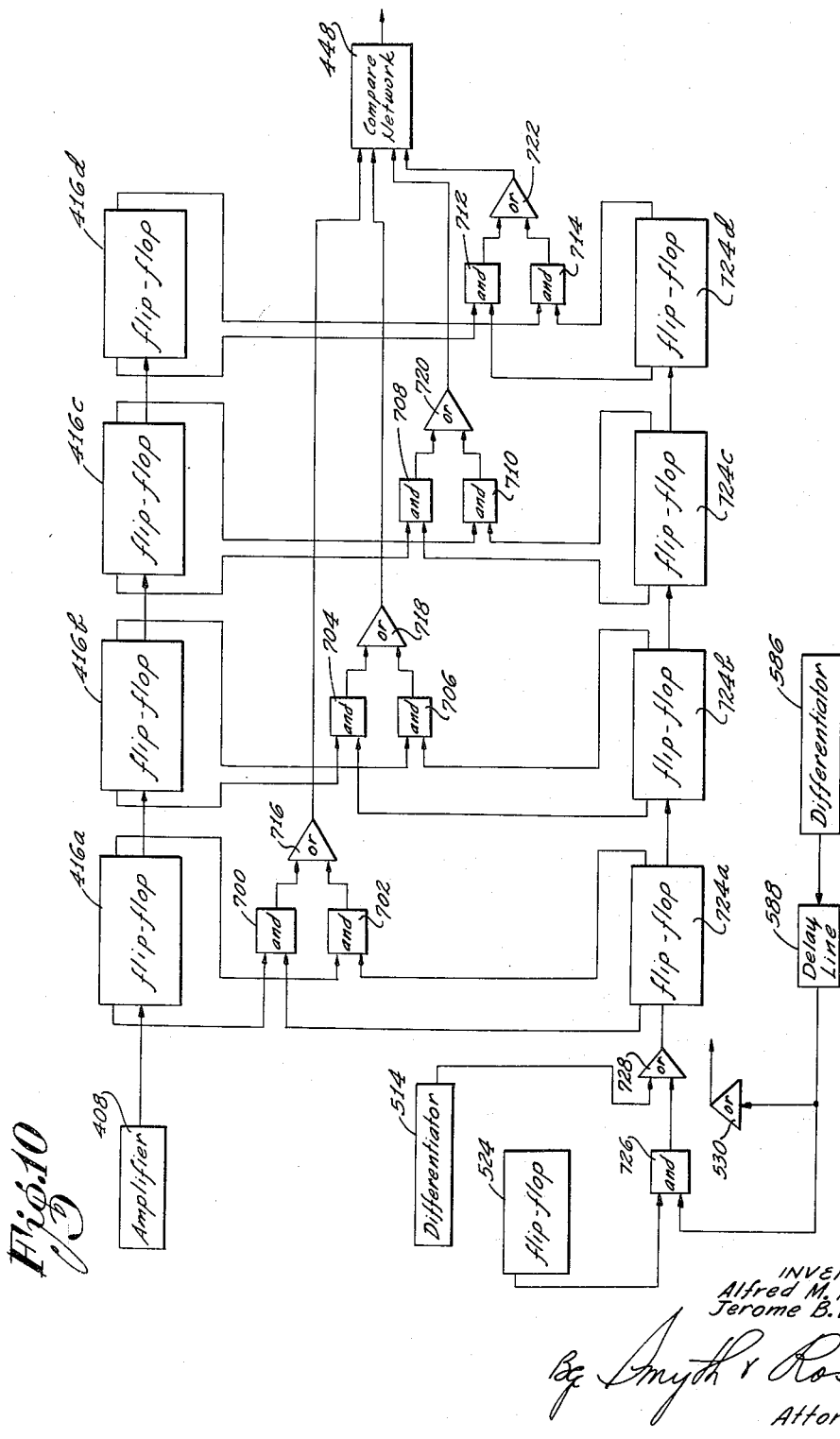

United States Patent Office 3,023,895
Patented Mar. 6, 1962

3,023,895
CARD PROCESSING SYSTEM
Alfred M. Nelson, Redondo Beach, and Jerome B. Wiener, Granada Hills, Calif., assignors to Magnavox Company, Los Angeles, Calif., a corporation of Delaware
Filed Aug. 26, 1957, Ser. No. 680,103
23 Claims. (Cl. 209—72)

This invention relates to data processing systems of the type in which data is stored on a multiplicity of separate information cards. More particularly, the invention is concerned with a system for automatically sorting such cards into any desired numerical or alphabetical order as represented by information recorded on the cards.

The information cards generally used in data processing systems have data recorded on them in accordance with various techniques, such as in the form of patterns of punched holes, or in the form of magnetic areas of one polarity or another. The system of the invention will be described in conjunction with the latter type of recording. It will become apparent, however, as the description proceeds that the sorting system of the invention can be used with punched cards, or with other types of cards having data recorded on them in other known ways. For example, the system can also be used with photographic information or with combinations of photographic or magnetic information.

The information cards to be utilized by the embodiment of this invention have a plurality of magnetic dots formed on one or on both of their surfaces. These dots are arranged in series of rows and columns on each card, each row being considered as formed from a plurality of successive horizontal positions and each column being formed from a plurality of vertical positions. The dots are magnetized, and each dot of one chosen polarity is said to represent a "1" or a "true" state, and each dot of the opposite polarity is said to represent a "0" or a "false" state. Therefore, each position on each card can be made to represent a different binary number.

Data processing systems in general have come into relatively widespread commercial use in recent years. These systems are used to streamline and speed up accounting operations, inventory controls, credit checking, for example; and they are also used in many other fields of activity. For these purposes and as noted above, each magnetic dot on each card in the system, either by itself or in combination with other dots on the card, represents digital information that may relate to words, numbers, alphabetical letters, or combinations of these.

It is evident that the need often arises in such data processing systems for the information cards in the system to be sorted. That is, it is often required that the cards be arranged in numerical, alphabetical, or any other order in a given stack. As mentioned briefly above, the improved system of the present invention is capable of quickly, effectively and automatically sorting the cards in accordance with the binary digital information at any selected position of the cards.

The sorting operation is initiated with the cards in an input stack. The cards then become transferred in succession to suitable transport means such as a rotatable drum. As the cards are transported by the drum, selected information on the cards is read by transducing means. This information is processed to obtain a separation between the cards having information of a particular nature and the cards having other information. For example, cards having a binary indication of "1" at a particular position in a selected column may be separated from cards having an indication of "0" at this position. The cards having the binary indication of "1" at the particular position in the selected column become deposited in a first output stack and the cards having a binary value of "0" at the particular position become deposited in a second output stack.

The cards from the first output stack then become returned to the input stack, and the cards from the second output stack subsequently become returned to the input stack. In this way, a merging operation is performed on the cards after the sorting operation. After the return of all of the cards to the input stack, a new cycle of operation is initiated to sort the cards in accordance with the information at a different position in the selected column on the cards. In this way, the cards become progressively sorted into a proper order and become merged after each sorting. The sorting occurs in successive passes for the different positions in the selected column and then continues for the different positions in successive selected columns. In the last merging operation, the cards become stacked in a logical order related to the information on the cards.

Although the invention is discussed primarily from the standpoint of sorting, the invention can be used in many other different types of data processing systems. For example, the invention can also be used in collating systems. This results from the fact that the invention primarily relates to a system for automatically processing cards in a plurality of operational cycles. In each cycle of operation, the cards are separated in accordance with particular processed information and are subsequently combined in an order related to the processed information. After the cards have been combined, a new cycle of operation is initiated to obtain a further processing of the cards. In this way, the cards become ultimately merged in an order reflecting the complete collating operation.

In the drawings:

FIGURE 1 is a top plan view of one embodiment of the sorting system and apparatus of the present invention, this view showing somewhat diagrammatically a pair of transporting drums for transporting information cards from a first station to a pair of additional stations, and for subsequently returning the cards to the original station in a sorted condition;

FIGURE 2 is a sectional view, substantially on the line 2—2 of FIGURE 1, and this view shows a section of one of the transporting drums of FIGURE 1 to particularly illustrate the constructional details of that drum;

FIGURE 3 is a sectional view, substantially on the line 3—3 of FIGURE 1, showing on an enlarged scale the details of a pneumatic gate transfer mechanism that is used for controllably transferring the information cards from one of the drums of FIGURE 1 to the other;

Figure 7:
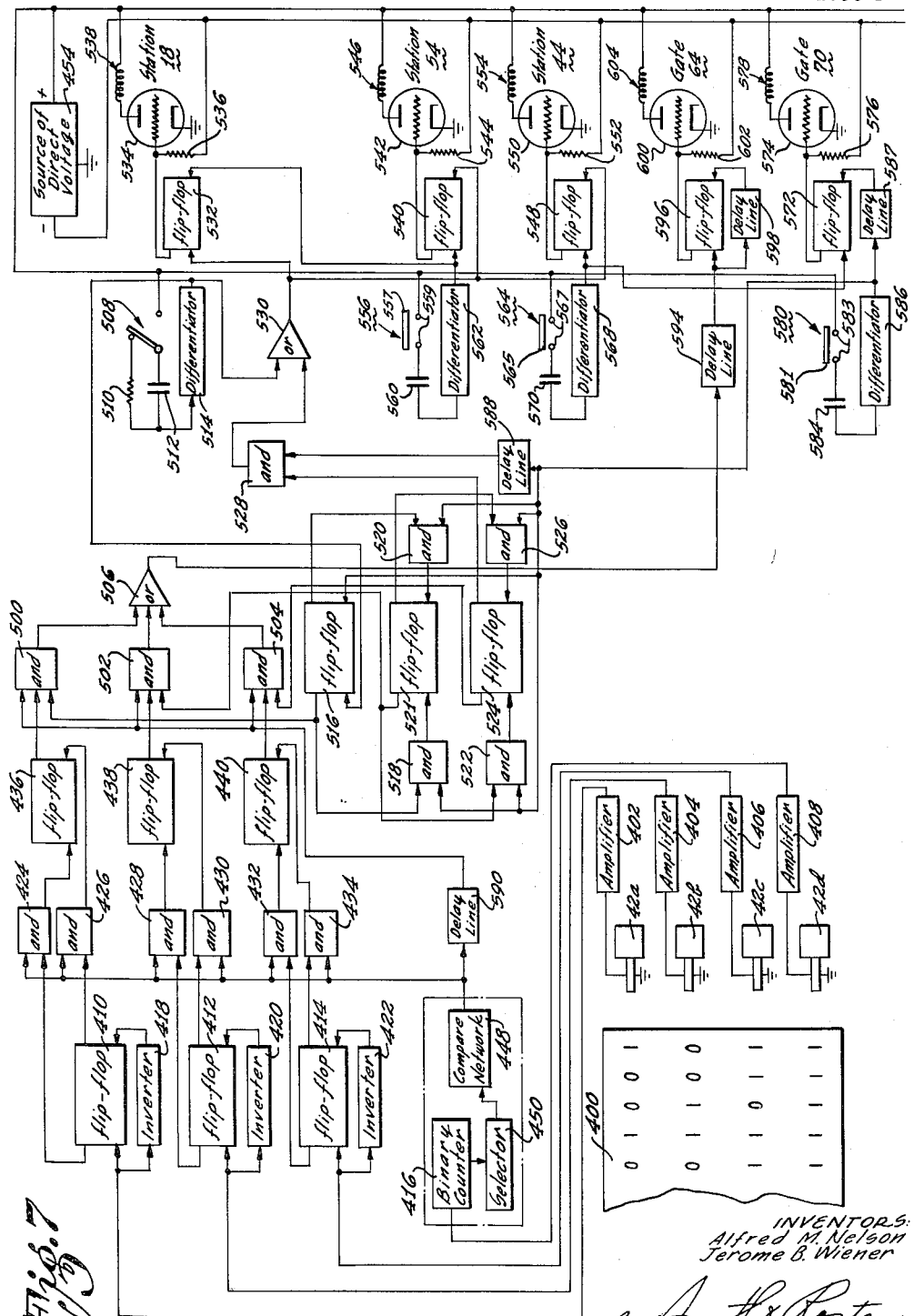

FIGURE 4 is a perspective view, on an enlarged scale with respect to FIGURE 1, showing a reversible mechanism that may be associated with any one of the stations of FIGURE 1, this mechanism being controllable to feed the cards in sequence from the station to the periphery of the adjacent transporting drum and alternately, to cause the cards to be removed sequentially from the drum and be stacked at that particular station;

FIGURE 5 is a bottom view of the reversible mechanism of FIGURE 4 and shows particularly a cam and lever arrangement for operating a stackhead and a feedhead in the mechanism to condition the particular station as a feeding station or as a stacking station;

FIGURE 6 is a side view of the mechanism of FIGURE 4, partly in section, showing a convenient motor and chain drive for the cam of FIGURE 5;

FIGURE 7 is a representation, partly in block form, of an electronic system for controlling the apparatus shown in FIGURES 1 to 6, inclusive, and for enabling that apparatus to sort the information cards used in the system in accordance with binary data recorded on the cards;

FIGURE 8 is a more detailed representation of a selector system used in the control system of FIGURE 7;

FIGURE 9 is a circuit diagram of a local control system for the individual transfer mechanisms of the various stations; and FIGURE 10 is a circuit diagram of an automatically controlled selector which is suitable for inclusion in the system of FIGURE 7, the disclosed selector permitting the system to automatically process successive positions on the cards.

The embodiment of the invention shown in FIGURE 1 includes a vacuum transporting drum 10 which is rotatably mounted on a supporting surface such as a table top 12. A second drum 16 is also mounted on the table top in contiguous relationship with the drum 10. The drums 10 and 16 are constructed to exert a vacuum pressure at their peripheral edges. This enables the cards to be firmly supported on those edges for transportation by the drums. The drums are spaced apart at their contiguous point sufficiently so as not to interfere with the cards transported on their peripheral edges. Both these drums may be of the same construction, and, for that reason, only the constructional details of the drum 16 will be discussed in conjunction with FIGURE 2. It should be appreciated that the drums such as the drums 10 and 16 are only one form of transport means that may be used. For example, other forms of members movable in a closed loop may also be used. These include endless belts. Stationary transport means may also be used.

The system includes a first reversible feeding-stacking station 18 which is positioned on the table top 12, and with its mouth placed adjacent the periphery of the drum 16. The station 18 includes a pair of spaced parallel guide rails 20 and 22, these guide rails being secured to the table top by a plurality of screws such as the screws 24.

A reversible mechanism is included in the station 18, and this mechanism may be of the type described and claimed in copending application Ser. No. 645,639, filed March 12, 1957, in the names of Alfred M. Nelson and Allan Orner and assigned to the assignee of record in this application (now Patent No. 2,969,979). The reversible mechanism will be described in some detail subsequently in conjunction with FIGURE 4. The mechanism includes a stackhead 26 which is movable in a slot 28 in the table top 12. The stackhead is movable from its illustrated standby position forward to a position in which its free end closes the space between the end of the rail 22 and the periphery of the drum 16.

A lifter assembly 30 is secured to the table top 12 by means of a pair of screws 32, and the lifter is positioned adjacent the guide rail 20. The lifter has a hollow rectangular portion that extends diagonally across the leading guide rail 20 and which terminates at the periphery of the drum 16. A series of pawls 34 are supported at the end of the rectangular portion of the lifter 30, and these pawls are contiguous to the periphery of the drum 16 and have bulged central portions that project radially outward from that periphery. The lifter assembly including the pawl 34 operates to insure that the cards become sequentially stacked in the station 18 in an order related to their movement toward the station. This results from the fact that the end of each card is lifted from the drum 16 by the pawl 34 so that the next card is able to pull the first card from the drum and into the station 18. It will be appreciated that each card originally becomes removed from the drum 16 by the pawl 34 but subsequently returns to the drum because of the vacuum force exerted by the drum on the card. In this way, only the trailing end of each card remains lifted from the drum 16 before the card becomes stacked in the station 18.

When the stackhead 26 is moved to its operative position, a card transported on the periphery of the drum 16 moves up over the pawls 34, and this card is arrested by the stackhead. The pawls 34 are displaced from the trailing guide rail 22 by a distance less than the length of the cards. Therefore, the trailing edge of the arrested card projects over the pawls 34. The next succeeding card then moves up under the arrested card, and it also is arrested by the stackhead 26 with its trailing edge projecting over the pawls 34. In this manner, cards successively transported by the drum 16 move up over the pawls 34 and against the stackhead 26 to be deposited in the proper order in the station 18.

While the stacking operation described above is taking place, a feedhead 36 which is included in the reversible mechanism is moved back in its slot 38 in the table top 12 to a standby position. As is fully described in the copending application referred to above, the feedhead 36 is coupled through a solenoid control valve to a vacuum source, and this head establishes a controllable vacuum pressure at its surface when it is moved forward to its operative position.

In a manner to be described, the stackhead 26 and the feedhead 36 are cam-actuated so that one is moved to its standby position when the other is moved to its operative position and vice versa. When the feedhead is moved to its operative position, the cards are retained in the station 18 as long as the vacuum pressure remains at its face. However, whenever this vacuum pressure is interrupted, the cards are transferred in a one-by-one sequence through the space between the periphery of the drum and the end of the guide rail 22 to the periphery of the drum 16.

A pusher member 40 is included in the station 18, and this member is spring-biased against the rear of the cards in the station. This pusher holds the cards firmly in stacked condition against the periphery of the drum 16 at the mouth of the station.

A plurality of transducer heads, indicated generally as 42, are mounted on the table top 12; and these heads are positioned in operative relationship with the periphery of the drum 16. The transducer heads 42 are displaced slightly from the mouth of the station 18 in the direction of rotation of the drum 16, and they are mounted between the mouth of that station and the contiguous point of the drum 10 and the drum 16. These heads are electro-magnetic transducers, and they serve to process each card as it moves with the drum 16 from the station 18 to the contiguous point between the drum 16 and the drum 10. That is, in a manner to be described, the heads 42 scan the binary data recorded on the cards to initiate certain control effects.

A second reversible feeding-stacking station 44 is also mounted on the table top 12, and this latter station is positioned with its mouth adjacent the periphery of the rotatable drum 10. The station 44 also includes a reversible mechanism which may be similar to the mechanism associated with the station 18.

The reversible mechanism included in the station 44 includes a stackhead 46, and it also includes a feedhead 48 and a lifter assembly 50. The station 44 includes a pusher member 52 which may be similar to the pusher 40 of the station 18.

The mechanism of the station 44 is controlled, in a manner similar to the mechanism described above, to have a first operative position in which cards in the station 44 are fed to the periphery of the drum 10, and to have a second operative position in which the cards are removed from the periphery of the drum 10 and deposited in the station 44.

In the first operative position of the mechanism, the feedhead 48 is moved to its operative position and the stackhead 46 is retracted to its standby position. Alternately, in the second operative condition of the reversible mechanism of the station 44, the stackhead 46 is moved to its operative position and the feedhead 48 is retracted to its standby position.

A third reversible feeding-stacking station 54 is also mounted on the table top 12. This latter station has its mouth adjacent the drum 16, and the station itself is positioned to be substantially diametrically opposite to the station 18. The station 54 also has a reversible mechanism which includes a feedhead 56, a stackhead 58, and a lifter assembly 60, all these elements cooperating and operating in a manner similar to those equivalent elements described above. Also, the station 54 also includes a pusher member 62 for maintaining the cards in that station in a stacked condition.

A first pneumatic gate transfer mechanism 64 is mounted on the table top 12, and this gate mechanism is positioned adjacent the periphery of the drum 16. A feed line 66 couples the gate transfer mechanism to an appropriate air pressure source. Air from that source is introduced to the gate through a solenoid-actuated valve 68 which is included in the line 66. When the valve 68 is open, air from the pressure source passes through the gate 64 and emerges as high velocity streams. These streams are directed tangentially of the drum 16, and they cause the leading end of a card transported by the drum 16 (and coming under the influence of the gate) to be raised up from the periphery of the drum 16. This brings the leading end of the card under the influence of the vacuum pressure at the periphery of the drum 10 and enables that card to be transferred to the periphery of the drum 10.

A gate transfer mechanism 70 is mounted adjacent the periphery of the drum 10. A feed line 72 couples the gate transfer mechanism 70 to an appropriate source of air pressure, and a solenoid-actuated valve 74 is interposed in the feed line. As in the latter instance, air pressure is introduced to the gate 70, and the gate produces streams of air tangentially of the drum 10. These streams cause any card coming under their influence to be lifted up from the periphery of the drum 10 and transferred to the drum 16.

As shown in detail in FIGURE 2, the drum 16 is made up of a lower section and an upper section. The drum 16 is similar to the drum disclosed and claimed in copending application Ser. No. 600,975, which was filed July 30, 1956, for Loren R. Wilson and assigned of record to the assignee of record in this application (now Patent No. 2,883,189). The lower section of the drum includes a disk-like bottom portion 118 and an integral, annular side portion 120. A pair of axially spaced, peripheral orifices 122 and 124 extend through the side portion 120. Each of the peripheral orifices is discontinuous in that it is interrupted at selected intervals about its periphery by a plurality of posts 126 which are integral with the side portion 120.

The disk-like bottom portion 118 of the lower section is undercut as shown at 128 to have a reduced diameter with respect to the outer diameter of the annular side portion 120. This enables the table top 12 to extend beyond the outer limits of the side portion 120 so that the portion 120 overlaps the table top in the manner shown. Therefore, even without excessively close tolerances between the edge of the table top 12 and the rotating surface of the drum 16, the cards supported endwise on the table top in the various stations have no tendency to slip down between the table and the drum to become misplaced or damaged.

The upper section of the drum 16 is in the form of a disk-like member 130 which engages the annular side portion 120 of the lower section. The upper section 130 forms an enclosure with the lower section of the drum, with the upper section being parallel to the disk-shaped bottom portion 118 of the lower section. The upper section 130 is held in place by a series of screws 132.

A deflector ring 140 is supported within the interior of the drum in press-fit with the inner surface of the annular side portion 120. This deflector ring is tapered toward the center of the drum, and it serves to prevent turbulence and to provide a streamlined path for air that is drawn in through the orifices 122 and 124 to create a vacuum pressure at the outer surface of the portion 120. Moreover, the under surface of the upper section 130 is bulged to have a convex shape. This also aids in providing a smooth path for the air drawn in through the orifices 122 and 124 so as to prevent turbulence.

The portion 118 of the lower section of the drum 16 contains a central opening surrounded by an annular collar 141. The collar 141 surrounds a collar 142 provided at one end of a hollow shaft 144. The drum 16 is supported on a shoulder formed by the collar 142, and the end of the shaft 144 extends into the opening of the portion 118 in friction-fit with that portion. Therefore, rotation of the hollow shaft 144 causes the drum 16 to rotate. Also, the interior of the shaft 144 communicates with the interior of the drum.

Bearings 146 are provided at the opposite ends of the shaft 144. The inner races of the bearings 146 are mounted on the shaft 144, and the outer races of the bearings are disposed against bushings 148 secured to a housing 150 by studs 152. An arcuate opening 156 is provided in the housing 150 between the bearings 146. This opening enables a drive belt 158 to extend into the housing and around a pulley 160. The pulley 160 is affixed to the shaft 144 between the bearings 146, and the pulley is held against axial movement by a pair of sleeves 162. In this manner, the shaft the shaft 144, and therefore, the drum 16 can be rotated by a suitable motor (not shown) coupled to the pulley 160 by the drive belt 158.

The bearings 146 and the sleeves 162 are held on the shaft 144 by a nut 166. The nut 166 is screwed on a threaded portion at the bottom of the shaft, and a lock washer 164 is interposed between it and the lower bearing. A sealing disk 168 is also screwed on the threaded portion at the bottom of the shaft 144. The sealing disk 168 operates in conjunction with a bottom plate 170 to inhibit the movement of air between the interior of the housing 150 and the interior of the hollow shaft 144 when a pressure differential exists between these components.

The bottom plate 170 is mounted on the bottom of the housing 150 by a plurality of studs 172, and this bottom plate has a central circular opening. A hollow conduit 174 extends into the opening in the bottom plate 170 in press fit with the plate. The conduit 174 is axially aligned with the hollow shaft 144 so that air may be exhausted from the hollow interiors of the shaft and the conduit by a vacuum pump 176. The vacuum pump may be of any suitable known construction and, for that reason, is shown merely in block form.

The vacuum pump 176 draws air in through the orifices 122 and 124, through the interior of the drum 16, down the shaft 144 and through the conduit 174. This creates a vacuum pressure at the outer peripheral surface of the annular portion 120 of the lower section of the drum 16. The deflector ring 140 and the convex underside of the disk-like upper section 130 assure that the air will flow smoothly and with a minimum of turbulence. This enables a high and adequate vacuum pressure to be provided around the outer surface of the annular side portion 120 firmly to retain the transported cards on that surface.

As noted above, the rotatable vacuum transporting drum 10 may be constructed in the same manner as the drum 16. Therefore, both the drums 10 and 16 are able to transport on their peripheral surfaces the cards fed to them from the various stations 18, 44 and 54 of FIGURE 1.

The gate transfer mechanism 64 may be constructed in the manner shown in FIGURE 3, and the gate transfer mechanism 70 may be similarly constructed.

As shown from the plan view of FIGURE 1, the gate 64 has an essentially tear-drop shape when viewed from the top or from the bottom. The gate has a bell-shaped chamber 200 (FIGURE 3) extending into the interior of the gate from its narrow end adjacent the drum 16. An apertured plate 202 closes the narrow end of the gate 64 adjacent the periphery of the drum 16, and this plate has a pair of apertures 204 extending through it. The apertures 204 are respectively aligned with the annular orifices 122 and 124 in the drum.

A right-angled passageway 206 extends from the rear of the chamber 200 and down through the bottom of the gate. The feed line 66 is coupled to the passageway 206 through any suitable threaded fitting 210. This fitting extends through the table top 12, and it is threaded into the passageway 206. A nut 212 is threaded to the fitting 210 and the nut engages the lower side of the table top 12. This nut serves to retain the gate firmly on the table top. This mounting permits the gate to be pivoted about the axis of the fitting 210 to a position such that the airstreams which pass out the apertures 204 extend tangentially of the drum 16.

The air pressure introduced to the gate through the feed line 66 emerges through the apertures 204 in the form of streams of high velocity. These streams are directed against the periphery of the drum 16, and as noted above, the gate is adjusted so that the streams extend tangentially to the drum 16 at a point adjacent the contiguous point of that drum with the drum 10. These streams counteract the vacuum pressure exerted through the orifices 122 and 124 in the drum 16. Therefore, as described briefly above, any card transported by the drum 16 into the influence of the airstreams from the gate 64 has its leading edge moved outwardly from the periphery of the drum 16. This brings the leading edge of that card under the influence of the vacuum pressure at the periphery of the drum 10. Further rotation of the drum 16 causes that card to be stripped completely from its periphery by the airstreams from the gate 64, so that the card is deposited on the periphery of the drum 10.

The thin leading end of the gate 64 is positioned to be slightly spaced from the periphery of the drum 16. This is so that the cards transported by the drum 16, in the absence of the airstreams from the gate 64, are able to pass between the gate and the drum 16 and thereby remain on the drum. Therefore, by controlling the introduction of air pressure to the gate 64 by controllably energizing the solenoid-actuated valve 68, the cards on the periphery of the drum 16 can be controllably transferred from the drum 16 to the drum 10 or left on the drum 16.

In like manner, by controlling the energizing of the solenoid actuated valve 74, the cards on the periphery of the drum 10 can be controllably transferred to the drum 16 or kept on the periphery of the drum 10. The gate 74 is spaced a sufficient distance from the drum 10 to permit cards on the periphery of that drum to pass between it and the drum in the absence of airstreams from the gate. The gate 70 is also pivoted to the table top 12, and this gate is positioned so that its airstreams are directed tangentially of the drum 10 at its contiguous point to the drum 16.

The reversible mechanism associated with the reversible feeding and stacking station 18 is shown in more detail in the perspective view of FIGURE 4. This view clearly shows the spaced parallel guide rails 20 and 22 which are secured to the table top 12. The stackhead 26 has a pair of fingers 250 secured to it at spaced positions in the vertical direction, and these fingers extend into peripheral grooves in the drum 16 adjacent the annular slots 122 and 124. The fingers 250 assure a positive co-operation between the stackhead and the drum so that cards transported by the drum may be positively arrested by the stackhead when it is moved into its operative position. As also shown in FIGURE 4, the end of the trailing guide rail 22 is bifurcated to provide a rectangular opening for the stackhead, and this opening receives the stackhead when the latter is moved to its operative position.

The end of the leading guide rail 20 is also bifurcated to receive the feedhead 36 as the feedhead is moved to its operative position. When the feedhead is so moved to its operative position, it enters the hollow rectangular area defined by the bracket portion of the lifter 30. The lifter 30, as shown in FIGURE 4, is mounted on a block 252 into which the screws 32 extend.

The feedhead 36 has a surface 254 which engages the cards in the station 18 when the feedhead is moved to its operative position. Suitable conduits extend through the feedhead as fully explained in the copending application Ser. No. 645,639 (now Patent No. 2,969,979), and these conduits terminate in orifices at the surface 254. A vacuum pressure is established at these orifices so that the leading card in the station 18, which has its trailing edge engaging the surface 254, is retained by that vacuum pressure against the force of the vacuum pressure established at the periphery of the drum 16. The latter vacuum pressure is exerted against the leading edge of the leading card and the drum tends to draw that card out of the station 18.

It is evident that whenever the vacuum pressure at the surface 254 is terminated, the vacuum pressure at the peripheral edge of the drum 16 draws the leading card out of the station 18. As noted above, the space between the guide rail 22 and the edge of the drum 16 is made such that one card at a time only can be drawn from the station by the drum 16. Therefore, when the vacuum pressure at the face 254 of the stackhead is terminated, the cards in the station are sequentially fed to the periphery of the drum 16.

The vacuum pressure at the surface 254 of the feedhead 36 may be conveniently terminated by energizing a solenoid actuated valve in the supply line to that head. A stud 256 (FIGURE 4) extends downwardly from the feedhead 36 into a slot 258, and this stud causes the feedhead to rotate about a pivot shaft 260 when the feedhead is retracted to its standby position. As fully described in the copending application Ser. No. 645,639 (now Patent No. 2,969,979), an internal valve may be incorporated in the feedhead to close off the vacuum pressure line when the feedhead is retracted to its standby position. The use of such a valve precludes any necessity for the continual energizing of the solenoid valve to close it when the feedhead is not in use.

As noted above, the feedhead 36 and the stackhead 26 are so controlled that when the feedhead is moved into its operative position, the stackhead is retracted to its standby position, and vice versa. The control of these two elements may be effected by a cam 262 (FIGURE 5) which is pivotally mounted on the underside of the table top 12 on a shaft 264 which extends through the table top. The feedhead 36 is mounted at one end of a lever 266. The lever 266 is pivoted to the table top 12 on a shaft 268 which extends through the table top. The feedhead 36 is mounted on one end of this lever by means, for example, of a stud 270. As shown in FIGURE 5, the feedhead receives its vacuum pressure from an appropriate line that may be slipped over a coupler 272 extending into the feedhead. As described previously, the feedhead 36 moves in an arcuate path corresponding to the configuration of the slot 38.

A cam follower 274 is rotatably mounted on the lever 266 between its pivot point and the end of the lever remote from the feedhead 36. The cam follower 274 is adapted to engage the periphery of the cam 262.

The stackhead 26 is mounted on one end of a lever 278 by a screw 279. The lever 278 is pivotally mounted on a pivot shaft 280 which extends through the table top 12, and the lever 278 is disposed on the opposite side of the cam 262 from the lever 266. A cam follower 282 is rotatably mounted on the lever 278. This cam follower is mounted between the pivot shaft 280 and the end of the lever 278 remote from the stackhead 26. The cam follower 282 engages the periphery of the cam 262.

A spring 284 extends between the remote ends of the levers 266 and 278, and this spring is fastened at its opposite ends to each of these levers. The spring 284 biases the cam followers 274 and 282 against the periphery of the cam 262.

The cam 262 is so shaped that when it is rotated through a 180° angle from a particular angular position, the lever 266 is adapted to be rotated in a clockwise direction in FIGURE 5 to bring the feedhead to its operative position. At the same time, the lever 278 is adapted to be rotated in a clockwise direction in FIGURE 5 to move the stackhead 26 to its standby position. Then, during the next 180° of rotation of the cam 262, the lever 266 rotates in a counterclockwise direction to move the feedhead 36 to its standby position, and the lever 278 also rotates in a counterclockwise direction to move the stackhead 26 to its operative position.

Therefore, an appropriate control of the cam 262 to rotate the cam through 180° causes the reversible station 18 to be conditioned in one instance as a feeding station, and in the other instance it causes the station to be conditioned as a stacking station. A suitable control for the cam 262 is shown in FIGURE 6. This control, like the mechanism of FIGURE 5, is similar to that which is described in detail in the copending application Ser. No. 645,639.

As shown in FIGURE 6, a sprocket 300 is mounted on the pivot shaft 264, and the sprocket is affixed to that shaft by means of a set screw 301. Rotation of the sprocket 300 causes the cam 262 to rotate.

A bracket 302 is suspended from the underside of the table top 12, and this bracket supports a drive motor 304 at its lower end. The drive shaft 306 of the motor extends vertically upwardly, and the drive shaft is coupled to a speed reducer 308. The speed reducer 308, in turn, is coupled to an overriding clutch 310, and the clutch has a drive shaft 312 extending upwardly from it. A second sprocket 314 is secured to the drive shaft 312 by means of a set screw 316. The sprocket 314 is positioned in the same horizontal plane as the sprocket 300, and a drive chain 318 intercouples the two sprockets.

The motor 304 is continually operated, and when the clutch 310 is engaged, the cam 262 is rotated to change the station 18 from one operational mode to the other. The clutch 310 is solenoid controlled in a manner described in detail in the copending application Ser. No. 645,639. The solenoid may be energized and each subsequent energizing of it causes it to engage for 180° rotation only. Therefore, successively energizing the solenoid causes the cam 262 to rotate in each instance through 180°. Therefore, each time this solenoid is energized the station 18 changes from its existing mode to its other mode.

It is assumed that the cards in the station 18 are to be sorted and stacked in accordance with the binary information represented by the data recorded at particular selected positions on the individual cards. It is also assumed that the binary information is recorded on the cards in vertical columns of increasing significance such that each bit reading downwardly in a vertical column has a digital value of increased significance. It should be appreciated, however, that the information may be recorded in any other pattern on the cards and that actually the information may be other than binary form. The column at the extreme right in FIGURE 7, for example, contains information relating to relatively low significance and each successive position in a downward direction in that column represents binary bits of increasing significance. Therefore, for a selected vertical column of a card, the least significant bit is at the top of the column, and the bits increase in significance down the column.

For the first pass, the cards in the station 18 are successively fed to the drum 16. A bit of binary information in the top row of a particular vertical column is first read by the heads 42 and, if this is "0," the corresponding card is transferred to the drum 10 and deposited in the station 44 of FIGURE 1. On the other hand, all of the cards having a value of "1" for the bit in the top row of the particular vertical column are deposited in the station 54 of FIGURE 1. The cards from the station 54 are then returned to the station 18 in succession, and subsequently the cards from the station 44 are successively returned to the station 18. This completes the first pass.

On the second pass, the cards are again fed from the station 18 to the periphery of the drum 16. The second least significant bit on each card in the particular vertical column is then read, and again, the "0's" are stacked successively in the station 44 and the "1's" are stacked successively in the station 54. The cards in the station 54 are again returned in succession to the station 18, followed by the cards in the station 44. This completes the second pass.

The passes or cycles of operation are continued for each significant bit of the binary information in the particular vertical column. That is, a different row is read at each pass, starting from the top and proceeding to the bottom. At the conclusion of the final pass, the cards become stacked in order in the station 18.

The transducer heads 42 of FIGURE 1, which process the cards transported on the drum 16 from the station 18, are represented in FIGURE 7 by a group of transducer heads, 42a, 42b, 42c and 42d. The heads 42a, 42b, and 42c scan the rows of bits of different binary significance on the cards. Of course, more or fewer heads can be used depending on the number of bits represented by the information on the cards at the various positions. The head 42d scans the lowest row of the cards. This lowest row has a series of "1's" recorded on it at the respective positions of the card, and it constitutes the clock channel of the corresponding card. Each of the heads 42a, 42b, 42c and 42d is disposed to scan a different horizontal row of information on the cards. The heads 42a, 42b, 42c and 42d may be vertically aligned but preferably are staggered. By staggering the heads, an increased spacing is obtained between the heads so as to facilitate the accuracy in the disposition of the heads. When the heads are staggered, each column on the card is not formed from aligned bits of information but is formed from bits which are disposed in the different rows in a configuration corresponding to the relative disposition of the heads.

The heads 42a, 42b, 42c and 42d are connected to a series of amplifiers 402, 404, 406 and 408 respectively. The output terminals of the amplifiers 402, 404 and 406 are connected to the left input terminals of a series of flip-flops 410, 412 and 414. The output terminal of the amplifier 408 is connected to a binary counter 416. The output terminals of the amplifiers 402, 404 and 406 are also respectively connected to a series of inverters 418, 420 and 422. The output terminals of the inverters are connected to the respective right input terminals of the flip-flops 410, 412 and 414.

The left and right output terminals of the flip-flop 410 are connected respectively to a pair of "and" networks 424 and 426. The left and right output terminals of the flip-flop 412 are connected respectively to a pair of "and" networks 428 and 430. The left and right output terminals of the flip-flop 414 are connected respectively to an "and" network 432 and to an "and" network 434.

The "and" network 424 is connected to the left input terminal of a flip-flop 436, and the "and" network 426 is connected to the right input terminal of that flip-flop. In similar manner, the "and" network 428 is connected to the left input terminal of a flip-flop 438, whereas the "and" network 430 is connected to the right input terminal of that flip-flop. Similarly, the "and" network 432 is connected to the left input terminal of a flip-flop 440, and the "and" network 434 is connected to the right input terminal of the flip-flop.

It should be pointed out that the units referred to above, and which shall be referred to subsequently, as "flip-flops," "and" networks and "or" networks are well known to the electronic computer art, and a detailed description of these units is believed to be unnecessary.

An "or" network is usually made up of a series of interconnected diodes and resistors and this network is designed to pass to a common output terminal any one of a plurality of signals which may be introduced to its input terminals.

An "and" network is also composed of a plurality of interconnected diodes, and resistors. The diodes in the "and" network are appropriately connected to pass a signal to a common output terminal of the network, only when a plurality of signals are simultaneously introduced to all of the various input terminals of the network.

A "flip-flop" is a bi-stable network which may be triggered to a "false" state by the trailing edge of a positive pulse introduced to its right input terminal, and which may be triggered to a "true" state by the trailing edge of a positive pulse introduced to its left input terminal. When the flip-flop is in a true state, it produces a relatively high voltage at its left output terminal and a relatively low voltage at its right output terminal. Conversely, when the flip-flop is in a false state, it produces a relatively low output voltage on its left output terminal and a relatively high output voltage on its right output terminal. As previously noted, the flip-flop circuit has bi-stable characteristics and will remain in either one of its stages until triggered to the other.

One of the information cards is represented as 400 in FIGURE 7. As previously noted, the information cards such as the card 400 may contain desired binary data which may be recorded on the cards in the form of dots of one magnetic polarity or the other. These dots, as mentioned previously, are arranged in a series of horizontal rows along the cards, with the rows placed one under the other to form a plurality of vertical columns across each card. Each of these vertical columns corresponds to a position of the card. Also as mentioned above, the bottom row of data contains magnetic dots of one polarity only, and these dots constitute clock data for the system.

In the illustrated embodiment, and as noted above, three rows of data and a row of clock recordings are shown. It is evident that more or fewer rows may be used, depending upon the amount of information desired. As also mentioned, each of the transducer heads 42a, 42b, and 42c is positioned to scan a different row of data on the card. Since the number of such heads may correspond to the number of rows, three heads are shown only by way of example. As described above, the transducer head 42d scans the bottom or clock row to produce the clock signals.

The binary counter 416 is connected to input terminals of a selector 450, the output from which is introduced to a compare network 448. The counter 416 counts the successive columns of each card presented to the transducers 42a, 42b, 42c and 42d. Upon the occurrence of a count from the counter 416 corresponding to the setting of the selector 450, a signal passes through the compare network 448. In this way, the information on any particular column of each card can be selected in accordance with the setting of the selector 450 so as to control the operation of the different stages shown in FIGURE 7. The output terminal of the compare network is connected to each of the "and" networks 424, 426, 430, 432 and 434. The combination of the units 416, 448 and 450 and their structural components will be described in detail in conjunction with FIGURE 8. The selector 450 may be adjusted so that the compare network 448 passes an output pulse to the "and" networks 424, 426, 428, 430, 432 and 434 at a selected count on the binary counter 416 corresponding to a selected vertical column on each of the cards such as the card 400.

Details of the connections between the binary counter 416 and the selector 450 and compare network 448, as previously noted, are shown in FIGURE 8. The binary counter 416 may be formed from a plurality of flip-flops 416a, 416b, 416c, and 416d. The selector 450 may also be formed from a plurality of flip-flops 450a, 450b, 450c and 450d connected in a counter arrangement. The left output terminals of the flip-flops 416a, 416b, 416c and 416d to the left and right output terminals of the associated flip-flops, and the movable arms of the switches are respectively connected to the compare network 448.

As will be seen from FIGURE 8, for any particular manual setting of the movable arms of the switches, they will have a relatively high voltage only when the corresponding flip-flops have a particular pattern of operational states. For example, a relatively high voltage appears on the armature of the switch 450a only when the flip-flop 416a is in a true state. Likewise, high voltages appear on the armatures of the switches 450b and 450c only when the flip-flops 416b and 416c are in a true state, and a relatively high voltage appears on the armature of the switch 450d only when the flip-flop 416d is in a false state. Only when the flip-flops have these particular states in the illustrated embodiment will the compare network pass a signal to its output lead. As will be seen, the compare network may be a conventional type of "and" network in this embodiment.

The flip-flops 416a, 416b, 416c and 416d may be connected in known manner to constitute the binary counter 416. The binary counter is successively triggered as each card is scanned. The switches 450a, 450b, 450c and 450d may be set to any desired pattern corresponding to any selected count established in the binary counter. This count may correspond to the desired column or position on the cards to be read. Although four flip-flops are shown in the binary counter, more or less can be used, depending upon the number of columns on each card.

Now, as cards are transported by the drum 16 past the heads 42a, 42b, 42c, and 42d, each card is scanned by the heads and the flip-flops 410, 412, and 414 are triggered into operational states corresponding to the rows of data on the successive cards. The inverters 418, 420 and 422 assure that the flip-flops will be triggered regardless of their preceding individual states. However, the triggering of the flip-flops 410, 412 and 414 is ineffective insofar as the rest of the system is concerned except for the selected position of each card, as established by the manual adjustment of the selector 450. This is because a pulse passed by the compare network 448 from the binary counter 416 only for the selected position. The pulse passed by the compare network 448 activates the "and" networks 424, 426, 428, 430, 432 and 434. This causes these "and" networks to pass information from the flip-flops 410, 412, and 414 to the flip-flops 436, 438 and 440 only at the selected position.

The flip-flops 436, 438 and 440 are constrained, therefore to assume individual operating conditions corresponding to the column of data on each card at the selected position. The flip-flop 436 represents the least significant binary bits, the flip-flop 438 represents the bits of the next higher significance; and the flip-flop 440 represents the bits of the next higher significance. The flip-flops 436, 438 and 440 are respectively connected to respective ones of a series of "and" networks 500, 502 and 504. The output terminals of these "and" networks are all connected to an "or" network 506.

The system includes a start switch 508 which is a single-pole double-throw type. One of the fixed contacts of the switch 508 is connected to the positive terminal of a source 454 of direct voltage. The other fixed contact of the switch is connected to a discharge resistor 510, and the armature of the switch is connected to a capacitor 512. The resistor 510 and the capacitor 512 are connected to the input terminal of a differentiator network 514.

The differentiator 514 may be constructed in a manner similar to that described on pages 2–27 to 2–38, inclusive, of "Principles of Radar," second edition, published by the Massachusetts Institute of Technology.

The output terminal of the differentiator 514 is connected to the left input terminal of a flip-flop 516. The left output terminal of the flip-flop 516 is connected to an input terminal of the "and" network 500 and to an input terminal of an "and" network 518. The right output terminal of the flip-flop 516 is connected to an "and" network 520 which, in turn, is connected to the right input terminal of a flip-flop 521. The output terminal of the "and" network 518 is connected to the left input terminal of the flip-flop 521, and the left output terminal of this flip-flop is connected to an input terminal of the "and" network 502.

The left output terminal of the flip-flop 521 is also connected to an input terminal of an "and" network 522. The output terminal of this "and" network is connected to the left input terminal of a flip-flop 524. The left output terminal of the flip-flop 524 is connected to an input terminal of the "and" network 504. The right output terminal of the flip-flop 521 is connected to an input terminal of an "and" network 526 which, in turn, is connected to the right input terminal of the flip-flop 524.

The right output terminal of the flip-flop 524 is connected to an input terminal of an "and" network 528. The output terminal of this "and" network is connected to an "or" network 530, as is the output terminal of the differentiator 514.

The "or" network 530 is connected to the left input terminal of a flip-flop 532. The left output terminal of this flip-flop is connected to the control grid of a triode 534. A resistor 536 connects this control grid to the negative terminal of the source 454. The anode of the triode 534 is connected to one terminal of the energizing winding of a relay 538 which controls the transfer mechanism associated with the reversible stacking-feeding station 18. The other terminal of this winding is connected to the positive terminal of the source 454.

When the relay 538 is energized the transfer mechanism of the station 18 is controlled by a suitable control circuit (which will be described in conjunction with FIGURE 9) so that the station functions as a feeding station. Alternately, when the relay 538 is not energized, the station 18 is conditioned through the control circuit to function as a stacking station. It will be remembered, that when the station 18 is conditioned to its feeding mode, the feedhead 36 is moved to its operative position and the stackhead 26 is retracted to its standby position. Alternately, when the station 18 is controlled to function in its stacking mode, the feedhead 36 is retracted to its standby position and the stackhead 26 is moved forward to its operative position.

The "or" network 530 is also connected to the right input terminal of a flip-flop 540. The left output terminal of the flip-flop 540 is connected to the control grid of a triode 542. This control grid is also connected to a resistor 544 which, in turn, is connected to the negative terminal of the source 454. The cathode of the triode 542 is grounded.

The anode of the triode 542 is connected to the energizing winding of a relay 546 which controls the transfer mechanism associated with the station 54. The other terminal of this winding is connected to the positive terminal of the source 454. By a suitable control circuit such as will be described in conjunction with FIGURE 9, the transfer mechanism of the station 54 is controlled so that when this winding is energized the feedhead 56 is moved into position and the stackhead 58 is retracted (FIGURE 1) so that the station 54 functions as a feeding station. Alternately, when the winding of the relay 546 is not energized the stackhead 58 is moved into position and the feedhead 56 is retracted so that the station 54 functions as a stacking station.

The "or" network 530 is also connected to the right input terminal of a flip-flop 548. The left output terminal of this flip-flop is connected to the control grid of a triode 550. The control grid is connected to the negative terminal of the source 454 by a resistor 552. The cathode of this triode is grounded, and the anode is connected to one terminal of the energizing winding of a relay 554. The other terminal of the winding 554 is connected to the positive terminal of the source 454 of direct voltage.

The relay 554 is included in a control circuit for the transfer mechanism associated with the station 44. This latter control circuit also may be similar to the one to be described in conjunction with FIGURE 9. When the relay winding is energized, the station 44 is conditioned to its feeding mode. That is, the stackhead 46 (FIGURE 1) is moved to its standby position and the feedhead 48 is moved to its operative position. Alternately, when the energizing winding of the relay 554 is not energized, the stackhead 46 is moved to its operative position and the feedhead 48 is moved to its standby position so that the station 54 functions in its stacking mode.

The station 18 includes a switch 556 which closes when the last card leaves that station. This switch has an armature 557 which is adapted to close across a pair of fixed contacts 559. Such a switch is described in copending application Ser. No. 645,639. As described in that application, the switch may comprise the pair of mutually insulated contacts 559 disposed on the face of the feedhead 36, and which contacts are closed by the armature 557 carried by the pusher member 40 and which engages the contacts when the last card leaves the station 18. One of the contacts of the switch 556 is connected to the positive terminal of the source 454. The other contact of the switch is connected to a capacitor 560. The capacitor, in turn, is connected to the input terminal of a differentiator 562. The output terminal of the differentiator is connected to the right input terminal of the flip-flop 532 and to the left input terminal of the flip-flop 540.

The station 54 includes a switch 564 which may be similar to the switch 556, and which has an armature 565 which closes a pair of fixed contacts 567 when the last card leaves the station 54. One contact of the switch 564 is connected to the positive terminal of the source 454. A capacitor 570 is connected between the other contact of the switch and the input terminal of a differentiator 568. The differentiator 568 is connected to the left input terminal of the flip-flop 548 and to the left input terminal of a flip-flop 572. The left output terminal of the flip-flop 572 is connected to the control grid of a triode 574. A resistor 576 connects this control grid to the negative terminal of the source 454. The cathode of the triode 574 is grounded, and the anode is connected to an energizing winding 578 associated with the solenoid actuated valve 74 (FIGURE 1) of the gate 70. Whenever this winding is energized, the solenoid valve 74 is opened so that the gate 70 issues streams of air to transfer cards from the drum 10 to the drum 16 in the manner described above.

The station 44 includes a switch 580 which is like the switches 564 and 556 and which has an armature 581 which closes a pair of fixed contacts 583 when the last card leaves this station. One contact of the switch 580 is connected to the positive terminal of the source 454, and the other contact of the switch is connected to a capacitor 584. The capacitor is connected to the input terminal of a differentiator 586.

The differentiator 586 is connected to a delay line 587 which, in turn, is connected to the right input terminal of the flip-flop 572. The differentiator 586 is also connected to a delay line 588, whose output terminal is connected to the "and" network 528. In addition, the output terminal of the differentiator 586 is connected to the right input terminal of the flip-flop 516, to the "and" network 520, to the "and" network 526, to the "and" network 518, and to the "and" network 522.

The compare network 448 is connected to a delay line 590 which, in turn, is connected to respective input terminals of the "and" networks 500, 502 and 504. The "or" network 506 is connected to a delay line 594. The delay line 594 is connected to the left input terminal of a flip-flop 596 and to a delay line 598. The delay line 598 is connected to the right input terminal of the flip-flop 596.

The left output terminal of the flip-flop 596 is connected to the control grid of a triode 600. A resistor 602 is connected between this control grid and the negative terminal of the source 454. The cathode of the triode 600 is grounded, and the anode of this triode is connected to the energizing winding associated with the solenoid valve 68 of the gate 64. The other terminal of this energizing winding 604 is connected to the positive terminal of the source 454. Therefore, when the triode 600 is conductive, the winding 604 is energized to activate the gate 64 and transfer cards from the drum 16 to the drum 10.

It is assumed that, prior to the start of operation, the station 18 in FIGURE 1 contains a stack of information cards that are to be sorted in accordance with binary data recorded on them, and that both the stations 44 and 54 are empty. To initiate the cycles of operation, the switch 508 is manually depressed and released. This causes the differentiator 514 to generate a sharp pulse, and this pulse passes through the "or" network 530 to trigger the flip-flop 532 to a true state and to trigger the flip-flops 540 and 548 to their false states.

The above triggering of the flip-flop 532 to a true state causes the triode 534 to become conductive and to produce a current in the energizing winding of the relay 538. This causes the station 18 to function as a feeding station, and cards from that station are successively fed to the periphery of the drum 16. At the same time, the triggering of the flip-flops 540 and 548 to false states render their associated triodes 542 and 550 non-conductive so that no current flows through the energizing windings of the relays 546 and 554 associated with the stations 54 and 44. The stations 54 and 44, therefore, are conditioned to operate in their stacking mode to select cards from the peripheries of the respective drums 16 and 10. During this operation, the switch 556 associated with the station 18 is opened because of the presence of a stack of cards in that station, and when the first cards enter the stations 54 and 44, the switches 564 and 580 respectively associated with those stations are also opened.

The cards successively fed by the station 18 to the periphery of the drum 16 are transported in succession past the heads 42a, 42b, 42c, and 42d. At the selected position of each card, as determined by the setting of the selector 450, the flip-flops 436, 438 and 440 are triggered into conditional states corresponding to the binary data on the respective cards at that position.

During the first pass or cycle of operation, the closure of the switch 508 also causes the differentiator 514 to trigger the flip-flop 516 to a true state. Therefore, the "and" network 500 is conditioned for translation. The flip-flops 521 and 524 in this first cycle are in their false states, however, so that the "and" networks 502 and 504 do not translate.

As noted above, the flip-flop 436 represents the digit of least significance for the selected position of each card. In the first cycle of operation, this flip-flop is successively triggered to its false or true states, depending upon whether the least significant bit of binary data at the selected position of the successive cards is "0" or "1." It is desired to transfer the "0's" to the drum 10 so that such cards may be deposited in the station 44. Therefore, during this first cycle of operation, the "and" network 500 is conditioned to pass a pulse for each card that triggers the flip-flop 436 to a false state. This pulse passes through the delay line 590, through the "or" network 506 and through the delay line 594 to the left input terminal of the flip-flop 596.

The delay line 594 permits each card requiring transfer to pass from the heads 42a, 42b, 42c and 42d to a point approaching the gate 64. Then, the flip-flop 596 is triggered to its true state to render the triode 600 conductive and cause the solenoid valve 68 to open so that the gate 64 may be activated and transfer that card to the drum 10. The delay line 598 permits the flip-flop 596 to be triggered to the true state long enough to cause one card only to be transferred from the drum 16 to the drum 10.

Therefore, each card whose least significant binary bit at the selected position is "0" is, in the first pass, transferred to the drum 10 on which it is transported to the station 44. These cards are deposited in the station 44 because as pointed out above, this station is in its stacking mode of operation. Alternately, each card whose least significant bit at the selected position is "1" is, in the first pass transported to the station 54. These latter cards are deposited in the station 54 because it too is conditioned to its stacking mode.

It will be noted that regardless of the triggered condition of the flip-flops 438 or 440 during this first pass, they have no effect on the system because the "and" networks 502 and 504 are both inactive.

When the last card leaves the station 18, the switch 556 closes to cause the differentiator 562 to produce a pulse which triggers the flip-flop 532 to a false state and which triggers the flip-flop 540 to a true state. This, in the previously described manner, causes the station 18 to be conditioned for receiving cards from the drum 16, and it conditions the station 54 to feed cards successively to the drum. The cards stacked in the station 54 are, therefore, successively returned to the drum 16 and transported back to the station 18. It will be remembered that each of these cards has a "1" recorded as the least significant binary bit at the selected position of each card.

When the last card leaves the station 54, the switch 564 closes. This causes the differentiator 568 to produce a pulse which triggers the flip-flop 548 to the true state and which also triggers the flip-flop 572 to the true state. This actuation of the flip-flops 548 and 572 transforms the station 44 into a condition to feed its cards successively to the periphery of the drum 10, and also activates the gate 70 so that these cards may be returned to the drum 16. The returned cards are then transported by the drum 16 back to the station 18. It will be remembered that all these cards from the station 44 have a "0" recorded as the last significant binary bit at the selected position of each card.

When the last card leaves the station 44 the switch 580 closes. This causes the differentiator 586 to produce a pulse which returns the flip-flop 572 to the false state after a delay imparted by the delay line 587. This return of the flip-flop 572 to its false state deactivates the gate 70. The delay line 587 causes the gate 70 to become deactivated after the last card from the station 44 has been returned from the drum 10 to the drum 16.

The closure of the switch 580 also causes the differentiator 586 to return the flip-flop 516 to its false state and to trigger the flip-flop 521 to the true state. The "and" networks 518, 520, 522 and 526 permit this to be done, and they aso provide that the flip-flop 524 is not triggered due to the original operation of the flip-flop 521 in the false state.

The system is now ready for the second pass or cycle of operations. In this second pass, the flip-flop 521 is in the true state to render the "and" network 502 conductive, but the flip-flops 516 and 524 are in the false state so that neither the "and" network 500 nor the "and" network 504 is conductive. Therefore, the representations of the flip-flop 438 only, which correspond to the digits of next ordinal significance at the selected position of the cards, are rendered effective.

The system is automatically started on its second pass by the pulse from the differentiator 586. This pulse is delayed by the delay line 588, a sufficient time to allow all the cards to be returned to the station 18. The pulse is then passed by the "and" network 528 (which is conditioned for translation as long as the flip-flop 524 is in its false state) and the pulse from the "and" network 528 passes through the "or" network 530 to the flip-flops 532, 540 and 548 to initiate the second pass in the same manner as the pulse from the differentiator 514 passed through this "or" network to initiate the first pass.

The operation proceeds as before, with the exception that the cards transferred to the station 44 are those whose second least significant binary bit is "0," as determined by the conditioning of the "and" network 502 by the flip-flop 521 to pass the indications of the flip-flop 438.

At the completion of the second pass, the switch 589 in the station 44 causes the differentiator 586 to trigger the flip-flop 524 to the true state and to return the flip-flop 521 to the false state. This actuation is permitted by the "and" networks 518, 522 and 526. Now, the system is ready for the third and last pass. For this last pass, the flip-flop 524 is in the true state to render the "and" network 504 conductive, but the flip-flops 516 and 521 are in the false state so that the "and" networks 500 and 502 are non-conductive.

The operation now proceeds as before, with the exception that the cards whose most significant binary bit is "0" are transferred from the drum 16 to the drum 10 to be transported to the station 44, and the other cards are deposited in the station 54. At the completion of this last pass, the cards returned to the station 18 are now sorted with respect to the binary information at the selected position.

Since no further passes are required, the flip-flop 524 which is now in a false state renders the "and" network 528 non-conductive. Therefore, the pulse from the differentiator 586 at the end of the last pass is ineffective to initiate a further pass and the system draws to a halt.

In the description of the control mechanism of FIGURE 6, it was stated that the clutch 310 is controlled by a solenoid. It was also pointed out that successive energizing of the solenoid permitted the cam 262 of FIGURE 5 to be turned successively through 180°, to cause the station alternately to function in its feeding mode and in its stacking mode. In the control system of FIGURE 7, however, the energizing of the relay 538 is stated as causing the station 18 to assume its feeding mode, and the deenergizing of that relay was stated as causing the station to assume its stacking mode. Similar controls for the other stations were described in that control system.

The control system of FIGURE 9 illustrates one means whereby the relay 538 may appropriately control the transfer mechanism of, for example, the station 18. It is evident that other similar controls may be used between the relays 546 and 554 and the controls for the transfer mechanisms of the stations 54 and 44.

It the control system of FIGURE 9, the energizing winding of the relay 538 is shown as controlling a double-throw relay switch 650. The armature of the relay switch 650 is connected to the positive terminal of the source of direct voltage 454. The normally closed fixed contact of the relay switch 650 is connected to a capacitor 652, and the normally open fixed contact of the relay switch 650 is connected to a capacitor 654. The capacitors 652 and 654 are connected to respective input terminals of an "or" network 656. The output terminal of the "or" network 656 is connected to the energizing winding 658 of the solenoid associated with the clutch 310 (FIGURE 6) and referred to above. The other terminal of the winding 658 of that solenoid is grounded.

Whenever the triode 534 is energized so as to energize the relay 538, the armature of the relay switch 650 closes on its normally open contact so that a charge of current flows into the capacitor 654. This produces a current pulse through the "or" network 656 and through the energizing winding 658. This current pulse is of a transient nature and persists until the capacitor 654 is fully charged. The pulse, however, persists for a sufficiently long time to cause the solenoid associated with the winding 658 to actuate the clutch 310 of FIGURE 6 so as to permit the cam 262 to move through 180° and condition the station 18 to its feeding mode.

Subsequently, when the triode 534 is deenergized, the resulting deenergizing of the relay 538 causes the armature 650 to shift to its normally closed contact. This causes a transient current pulse to flow into the capacitor 652 and such pulse to flow through the winding 658 again to actuate the solenoid associated with that winding. This causes the clutch 380 to permit the cam 262 to rotate a second 180° and to condition the station to its stacking mode.

Therefore, each time the relay 538 is energized, the reversible mechanism control is actuated to condition the station 18 as a feeding station. Alternately, each time the relay 538 is deenergized, the station is controlled to function as a stacking station. The relay 538 may include appropriate auxiliary switches for discharging the capacitors 654 and 652 when such are individually out of the energizing circuit for the winding 658.

It will be noted that by the system of FIGURE 7, the cards may be sorted with respect to the binary data in the column corresponding to the position on each card selected for processing. The position is selected, as noted previously in this specification, by the manual adjustment of the selector network 450.

It is often desirable, however, that the cards be sorted progressively from one position to the next. This enables the cards to be completely sorted with respect to all the data recorded on them. In the system of FIGURE 7, this latter process is achieved by manually adjusting the selector network 450 at the end of each of the described sequence of operations to the next position, and by the manual actuation of the switch 508 to initiate each new sequence. The fragmentary circuit of FIGURE 10 may be incorporated into the system of FIGURE 7 to enable that system to automatically process one column after another on each card, each column being processed in accordance with the sequence of passes described above.

The binary counter 416 is represented in FIGURE 8 in schematic form by a series of flip-flops 416a, 416b, 416c and 416d. As described, these flip-flops are connected in known manner to form successive stages of a usual binary counter. The flip-flop 416a may be considered to represent the least significant digit, and it is triggered alternately to its "true" state and to its "false" state by successive pulses from the amplifier 408. The flip-flop 416b may represent the next significant digit, and it is triggered from one state to another only when the flip-flop 416a is in a particular one of its two states. In like manner, the flip-flop 416c and 416d may be connected in usual manner to represent digits of increasing significance.

In FIGURE 8, the output terminals of the flip-flops 416a, 416b, 416c and 416d are shown as connected to a series of switches 450a, 450b, 450c and 450d. It was suggested that these switches be manually operated to a desired operational pattern corresponding to a selected position on each card to be proceesed. In the system of FIGURE 10, the switches are represented by a series of "and" and "or" networks.

The left and right output terminals of the flip-flop 416a are connected respectively to a pair of "and" networks 700 and 702. In like manner, the left and right output terminals of the flip-flop 416b are connected to a pair of "and" networks 704 and 706, the left and right output terminals of the flip-flop 416c are connected to a pair of "and" networks 708 and 710, and the left and right output terminals of the flip-flop 416d are connected to a pair of "and" networks 712 and 714.

The "and" networks 700 and 702 are connected to an "or" network 716, and the "and" networks 704 and 706 are connected to "or" network 718. Likewise, the "and" networks 708 and 710 are connected to an "or" network 720, and the "and" network 712 and 714 are connected to an "or" network 722. The "or" networks 716, 718, 720 and 722 are all connected to the compare network 448.

The system of FIGURE 10 includes a second binary counter which may be connected in the same manner as the binary counter 416 and which includes a series of flip-flops 724a, 724b, 724c, and 724d. These flip-flops are connected in known manner so that successive pulses introduced to the flip-flop 724a causes it to be triggered successively to its "true" and "false" states. Like the flip-flop 416b in the binary counter 416, the flip-flop 724b is triggered only when the flip-flop 724a is in a particular one of its two states, and so on.

It will be remembered in the system of FIGURE 7 that the delay line 588 was connected to the "or" network 530 through the "and" network 528. The "and" network 528 was conditioned for translation by the flip-flop 524 in its true state and was cut off at the end of the last pass of each sequence of sorting operations. The purpose of this was to prevent a new sequence of operations from being initiated after a complete sorting operation had been performed for any particular position on the cards. In the embodiment of FIGURE 10, the "and" network 528 is dispensed with. Instead, the delay line 588 is connected directly to the "or" network 530 and this delay line is also connected to an "and" network 726. The "and" network 726 is connected to the left output terminal of the flip-flop 524, and the output terminal of the "and" network 726 is connected to the input terminal of the binary counter made up of the flip-flops 724a, 724b, 724c, and 724d. The latter connection is made through an "or" network 728, and the start differentiator 514 is also connected to this "or" network.

It will be assumed that the counter 416 is initially set at zero, and that the flip-flops 724a, 724b, 724c and 724d are all initially in their "false" states for a zero count in the binary counter which they comprise. Now, the start of the system by the manual actuation of the switch 508 in FIGURE 7 will cause the resulting pulse from the differentiator 514 to trigger the flip-flop 724a to its "true" state to constitute a count of "1" in the counter. Then, the first pulse from the amplifier 408 corresponding to the first position on the card being processed will trigger the flip-flop 416a to its "true" state.

Only when the condition of the flip-flops 416a, 416b, 416c and 416d matches the condition of the flip-flops 724a, 724b, 724c and 724d will the "and" networks 700, 702, 704, 706, 708, 710, 712 and 714 be properly conditioned to allow the compare network 448 to exhibit a relatively high voltage at its output lead.

Therefore, for the initial operation of the flip-flop 724a by the pulse from the differentiator 514, only the first position of each card will be processed. This processing will continue from card to card in the manner described in conjunction with FIGURE 7 until all the cards have been sorted with respect to the binary data at the first position. At that time, the flip-flop 524 is false so that when the last card leaves the station 44 and causes the differentiator 586 to develop an output pulse, this pulse will be passed by the "and" network 726 to trigger the counter made up of the flip-flops 724a, 724b, 724c, and 724d to its second count. This, in a manner similar to that described above, now enables the second position of each card to be processed, and the pulse from the differentiator 586 is translated by the "or" network 530, after a proper delay in the delay line 588, to initiate the second sequence of operations.

In the manner described above, the processing is automatically continued from one column or position on each card to the next until all of the columns have been processed, and the cards have been sorted with respect to the data on all columns.

The invention provides a system for automatically processing cards through a plurality of operational cycles. In each cycle, the cards become separated in accordance with selected information on the cards. The cards then become consolidated or merged into an input stack in an order related to the processed information. A new cycle of operation is then initiated to separate the cards in accordance with other information on the cards. In this way, progressive refinement in the operation of processing the cards can be obtained in the successive cycles of operation. This progressive processing of information has been described in this application with particular reference to a sorting operation. However, a person skilled in the art will recognize that the progressive processing of information lends itself to other types of data handling systems such as collating systems.

It should be appreciated that the term "cards" as used in the specification and in the claims is intended to cover any type of discrete elements which are capable of recording information and subsequently reproducing such recorded information. The term "input means" as used in the claims is intended to cover the reversible mechanism associated with the station 18. Other terms used in the claims for the reversible station include "station means" and "transfer mechanisms." The term "output means" as used in the claims is intended to cover the reversible mechanism associated with the stations 44 and 54. Other terms used in the claims to describe such reversible mechanisms include "receiving means" and "transfer mechanisms."

The term "transducer means" as used in the claims is intended to relate to the heads 42. The term "processing means" as used in the claims is intended to include the electrical circuitry associated with the heads 42 for producing signals in accordance with the indications at particular positions on the transported cards. The various "control means" recited in the claims are intended to include the electrical circuitry shown in FIGURES 7 to 10, inclusive, for controlling the operation of the different mechanisms included in the invention.

Although this application has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. In a system for processing a plurality of information cards, the combination of: transport means for the cards; a first station and at least a pair of additional stations each constructed to hold the cards in the plurality in stacked relationship; feed means operative upon the cards and disposed relative to the transport means and the first station for obtaining a controlled transfer of such information cards from the first station to the transport means in a first relationship and for obtaining a transfer of cards from the transport means to the first station in a second relationship; means operative upon the transported cards for processing first particular information on each individual one of the cards transferred to the transport means from the first station to produce signals in accordance with such processed information; stack means responsive to the signals from the processing means for each of the transported cards and disposed relative to the pair of stations and to the transport means for obtaining a transfer to the pair of stations of selected ones of the transported cards in accordance with such signals for each individual one of the transported cards in a first relationship, the stack means also being operative in a second relationship to obtain a transfer of cards from the pair of stations to the transport means; first control means responsive to the transfer of the cards from the first station for obtaining an operation of the stack means in the second relationship to produce a controlled transfer of the cards from the pair of stations to the transport means for return of the cards by the transport means to the first station; second control means responsive to the transfer of the cards from the first station for obtaining an operation of the feed means in the second relationship to obtain a transfer of the cards from the transport means to the first station for further processing upon a transfer of cards from the pair of stations to the transport means; means responsive to the transfer of the cards from the pair of stations to the transport means for obtaining an operation of the feed means in the first relationship to obtain a new transfer of cards from the first station to the transport means; means responsive to the transfer of the cards from the pair of stations to the transport means for obtaining an operation of the stack means in the first relationship to obtain a new transfer of cards from the transport means to the pair of stations; and means operatively coupled to the processing means for activating the processing means upon the new transfer of the cards from the first station to the transport means to obtain a processing of second particular information on each individual one of the cards and a production of signals in accordance with such processing.

2. The combination set forth in claim 1 in which the transport means are rotatable and are provided with a periphery and are constructed to produce a vacuum at the periphery of the drum for holding the cards in fixed position on the periphery of the drum for rotation with the drum.

3. In a system for processing a plurality of information cards, the combination of: transport means for the cards; first, second and third stations each constructed to hold the cards in the plurality in stacked relationship; first, second and third reversible station means respectively associated with the first, second and third stations and with the transport means and operative in a first relationship to obtain a controlled transfer of cards to the transport means from the associated stations and operative in a second relationship to obtain a transfer of cards from the transport means to the associated stations; means operative upon the first station means in the first operative relationship of the first station means to obtain a controlled transfer of the cards from the first station to the transport means; means including transducing means disposed relative to the cards on the transport means for processing first particular information on each individual one of the transported cards to produce signals in accordance with such processing; first control means responsive to the signals produced by the processing means and operative in the second operative relationships of the second and third station means for controlling the movements of the cards to obtain a transfer of different ones of such cards from the transport means to the second and third stations in accordance with the information processed on each individual one of the cards; second control means responsive to the transfer of the cards from the first station to the second and third stations for obtaining the operation of the second station means in the first operative relationship to obtain a transfer of cards from the second station to the transport means and for obtaining an operation of the first station means in the second operative relationship to obtain a transfer of such cards from the transport means into the first station for further processing; third control means responsive to the transfer of the cards from the second station to the first station for obtaining the operation of the third station means in the first relationship to obtain a transfer of cards from the third station to the transport means and to obtain a transfer of such cards into the first station for further processing; fourth control means responsive to the transfer of the cards from the second and third stations to the first station for obtaining an operation of the first station means in the first relationship and an operation of the second and third station means in the second relationship to provide a second transfer of cards from the first station to the second and third stations; and fifth control means responsive to the transfer of the cards from the second and third stations to the first station for obtaining an operation of the transducing means to process second particular information on the cards for a control over the movements of the cards and for a control over the transfer of the cards to the second and third stations in accordance with such processing.

4. In a system for processing a plurality of information cards, the combination of: transport means constructed to obtain a movement of the cards; first, second and third stations each constructed to hold the cards in the plurality in stacked relationship; first, second and third reversible station means respectively disposed relative to the first, second and third stations and to the transport means for obtaining a controlled transfer of the cards to the transport means from the associated stations in a first operative relationship and for obtaining a transfer of such cards from the transport means to the associated stations in a second operative relationship; means operative upon the first reversible station means in the first operative relationship of the first station means for obtaining a controlled transfer of such cards from the first station to the transport means; means including transducing means disposed relative to the cards on the transport means for processing first particular information on each individual one of the transported cards to produce signals for each individual one of the transported cards in accordance with such processing; first control means responsive to the signals produced by the processing means and operative in the second operative relationship of the second and third station means for controlling the path of transport of the cards to obtain a transfer of different ones of the cards from the transport means to the second and third stations in accordance with the information processed on each individual one of the cards; second control means responsive to the transfer of the cards from the first station to the second and third stations and coupled to the first, second and third station means for obtaining an operation of the first and second station means in the first operative relationship and an operation of the first station means in the second relationship after the transfer of cards in the plurality to the second and third stations to obtain a transfer of the cards in the second station in sequence to the transport means for return to the first station and to subsequently obtain a transfer of the cards in the third station to the transport means for return to the first station after the transfer of the cards from the second station to the first station; third control means responsive to the transfer of the cards from the second and third stations to the first station for obtaining an operation of the first station in the first operating relationship and an operation of the second and third stations in the second operating relationship for a second controlled transfer of cards from the first station to the transport means; fourth control means responsive to the second transfer of cards from the first station for obtaining a processing of second particular information on the cards by the transducing means; and fifth control means responsive to the signals produced by the transducing means in accordance with the processing of the second particular information on the cards for obtaining an operation of the first control means to control the paths of movement of the cards and the transfer of the cards to the second and third stations.

5. In apparatus for processing a plurality of information cards, the combination of: transport means constructed to obtain a movement of the cards; first, second and third stations each constructed to hold the cards in the plurality in stacked relationship; feed means operative upon the cards and disposed relative to the transport means and the first station for obtaining a controlled transfer of the information cards from the first station to the transport means; first stack means operative upon the cards on the transport means and disposed relative to the transport means and the second station for obtaining a transfer of selected ones of such cards from the transport means to the second station upon the movement of the cards through a first particular path; second stack means operative upon the cards on the transport means and disposed relative to the transport means and the third station for obtaining a transfer of the remaining ones of such cards from the transport means to the third station upon the movement of such remaining cards through a second particular path different from the first particular path; means operative upon the transported cards for processing first particular information on each individual one of the cards transferred to the transport means to produce signals for each individual one of the cards in accordance with such processing; first control means responsive to the signals produced by the processing means for obtaining a movement of first particular ones of the cards through the first particular path to the second station in accordance with the information processed on each individual one of the cards and for obtaining a movement of second particular ones of the cards through the second particular path to the second station in accordance with the information processed on each individual one of the cards; the feed means also being constructed to obtain a transfer of cards from the transport means to the first station and the first and second stack means also being constructed to obtain a transfer of cards respectively from the second and third stations to the transport means; second control means responsive to the transfer of the cards from the first station to the second and third stations for operating upon the first and second stack means to obtain a transfer of the cards from the second and third stations to the transport means for the transport of the cards to said feed means in an order related to the information processed on the cards and after the transfer of the cards from the first station to the second and third stations; and means responsive to the transfer of the cards to the transport means from the first station for operating upon the feed means to obtain a transfer to the first station of the cards transferred to the transport means from the second and third stations.

6. The combination set forth in claim 5, including, means responsive to the transfer of the cards from the second and third stations to the first station for operating upon the feed means and the first and second stack means to obtain a second transfer of the cards from the first station to the transport means for transport to the second and third stations, and means responsive to the second transfer of cards from the first station to the transport means for activating the transducing means to obtain the processing of second particular information on the transported cards by the transducing means and for activating the first control means to control the movements of the cards in accordance with such processed information.

7. In apparatus for processing a plurality of information cards, the combination of: transport means having a closed loop of movement and constructed to obtain a movement of cards with the transport means; first, second and third stations each constructed to hold the cards in the plurality in stacked relationship; feed means operative upon the cards and disposed relative to the first station and the transport means for obtaining a sequential transfer of the information cards from the first station to the transport means; first stack means operative upon the transported cards and disposed relative to the transport means and the second station for obtaining a transfer of cards from the second station upon a transport of the cards through a first particular path; second stack means operative upon the transported cards and disposed relative to the transport means and the third station for obtaining a transfer of cards from the transport means to the third station upon a transport of the cards through a second particular path different from the first particular path; means including transducing means disposed relative to the cards on the transport means for processing first particular information on each individual one of the transported cards to produce signals in accordance with the processed information; first control means responsive to the signals produced by the processing means for obtaining a transport of selected ones of the cards through the first particular path to the second station in accordance with the signals produced by the transducing means for each individual one of the cards and for obtaining a transport of the other ones of the cards to the third station in accordance with the signals produced by the transducing means for each individual one of the cards; the feed means also being constructed to obtain a transfer of cards from the transport means to the first station and the first and second stack means also being constructed to obtain a transfer of cards respectively from the second and third stations to the transport means; second control means responsive to the transfer of the cards from the first station to the second and third stations for operating upon the second stack means and the feed means to obtain a transfer of the cards in the second station in sequence to the transport means for transport of the cards through the first particular path to the first station for further processing of second particular information on the cards; and third control means responsive to the return of the cards from the second station to the first station for operating upon the second stack means to obtain a transfer of the cards in the third station in sequence to the transport means for transport through the second particular path to the first station for further processing of the second particular information on the cards.

8. The combination set forth in claim 7 in which third control means are responsive to the transfer of the cards from the second and third stations to the first station for operating upon the feed means and the first and second stack means to obtain a second transfer of the cards from the first station to the transport means for movement to the second and third stations, and in which fourth control means are responsive to the second transfer of cards from the first station to the transport means for activating the transducing means to obtain the processing of second particular information on each individual one of the cards and for activating the first control means to obtain the movements of the cards to the second and third stations in accordance with such processed information for each individual one of the cards.

9. In apparatus for processing a plurality of information cards, the combination of: transport means having a closed loop of travel and constructed to obtain a movement of cards with the transport means; first, second and third stations each constructed to hold the cards in the plurality in stacked relationship; feed means operative upon the cards and disposed relative to the first station and the transport means for obtaining a controlled transfer of the information cards to the transport means from the first station; first stack means operative upon the cards in the plurality and disposed relative to the transport means and the second station for obtaining a transfer of such cards from the transport means to the second station in accordance with the movement of the cards in a first particular path; second stack means operative upon the cards and disposed relative to the transport means and the third station for obtaining a transfer of such cards from the transport means to the third station in accordance with the movement of the cards in a second particular path different from the first particular path, means including transducing means disposed relative to the cards on the transport means for processing first particular information on each individual one of such cards to produce signals in accordance with such processed information, first control means responsive to the signals produced by the processing means for controlling the movements of the cards in the first and second particular paths to obtain a transfer of selected ones of the cards to the second station and a transfer of the other ones of the cards to the third station in accordance with the signals produced by the processing means for each individual one of the cards, second control means responsive to each transfer of the cards from the first station to the second and third stations for operating upon the second stack means and the feed means for obtaining a transfer of the cards in the second station to the transport means for transport to the first station after the transfer of the cards from the first station to the second and third stations, third control means responsive to each transfer of the cards from the second station to the first station for operating upon the second stack means to obtain a transfer of the cards in the third station to the transport means for transport to the first station, fourth control means responsive to each transfer of the cards from the second and third stations to the transport means for operating upon the feed means and the first and second stack means to obtain a subsequent transfer of the cards from the first station to the second and third stations, and fifth control means responsive to each subsequent transfer of cards from the first station to the transport means for activating the processing means to obtain a processing of progressive information on the cards by the processing means and for activating the first control means to control the movements of the cards in the first and second particular paths in accordance with the processing of such progressive information.

10. In apparatus for processing a plurality of information cards, the combination of: transport means for the cards; first, second and third stations each constructed to hold the cards in the plurality in stacked relationship; feed means disposed relative to the transport means and the first station and operative upon the cards in a first relationship for obtaining a transfer of such information cards from the first station to the transport means and operative in a second relationship to obtain a transfer of cards from the transport means to the first station; first stack means disposed relative to the transport means and the second station and operative in a first relationship for obtaining a transfer of the cards from the first station to the transport means and operative in a second relationship for obtaining a transfer of such cards from the transport means to the second station; second stack means disposed relative to the transport means and the third station and operative in a first relationship for obtaining a transfer of cards from the third station to the transport means and operative in a second relationship upon the transported cards for obtaining a transfer of such cards from the transport means to the third station prior to the transportation of the cards to the second station; means including transducing means disposed relative to cards on the transport means for processing progressive information on each individual one of the cards in successive cycles of operation to produce signals in accordance with such processed information; gate means disposed relative to the cards on the transport means for controlling the movement of the cards from the first station to the second stack means prior to the movement of the cards to the first stack means; first control means responsive to the signals from the processing means in each cycle of operation and operative upon the gate means to obtain a transfer of particular ones of the cards to the second station in accordance with the information processed on each individual one of the cards in that cycle of operation and for causing the remaining cards in that cycle to be transferred to the third station in that cycle of operation; second control means responsive to the transfer of the cards in the plurality from the first station to the second and third stations in each cycle of operation for initially obtaining an operation of the first stack means in the first relationship and an operation of the feed means in the second relationship and for obtaining a controlled operation of the gate means to provide a transfer of the cards in the second station to the first station for processing of the cards in the next cycle of operation; and third control means responsive to the return of the cards in the second station to the first station in each cycle of operation for obtaining an operation of the second stack means in the second relationship and a controlled operation of the gate means to provide a transfer of the cards in the third station to the first station for further processing in the cards in the next cycle of operation.

11. The combination set forth in claim 10 in which fourth control means are responsive to the transfer of the cards from the second and third stations in each cycle of operation to obtain an operation of the first transfer mechanism in the first relationship in the next cycle of operation and an operation of the second and third transfer mechanisms in the second relationship in the next cycle of operation for a second transfer of the cards from the first station to the second and third stations and in which fifth control means are responsive to the transfer of the cards from the first station in each cycle of operation for activating the transducing means to obtain the processing of progressive information on each individual one of the cards and in which the transport means are constructed to obtain a continuous movement of the cards and in which the gate means are constructed to control the movements of the cards to the second and third stations in each cycle of operation without interrupting the continuous movements of the cards until the cards reach the stations.

12. In apparatus for processing a plurality of information cards, the combination of: transport means for the cards; first, second and third stations each constructed to hold the cards in the plurality in stacked relationship; feed means operative upon the cards in the plurality and disposed relative to the transport means and the first station for obtaining a transfer of such cards from the first station to the transport means; first stack means operative upon the transported cards and disposed relative to the transport means and the second station for obtaining a transfer of cards from the transport means to the second station in accordance with the movements of the cards through a first particular path; second stack means operative upon the transported cards and disposed relative to the transport means and the third station for obtaining a transfer of cards from the transport means to the third station in accordance with the movements of the cards through a second particular path different from the first particular path; the feed means being constructed to obtain a transfer of cards from the transport means to the first station and the first and second sack means being constructed to obtain a transfer of cards from the respective ones of the second and third stations to the transport means; means including transducing means disposed relative to the cards transferred to the transport means from the first station for processing information on the cards to produce signals in accordance with the processed information; first control means operatively coupled to the processing means for obtaining a cycling of the apparatus through a plurality of passes and for causing the cards having particular information of progressive digital significance to be moved through the first particular path and to be transferred to the first station in successive ones of such passes in accordance with the processing of the information on the cards in such passes and for causing the other cards in the plurality to be moved through the second particular path and to be transferred to the second station in the passes; second control means operative upon each transfer of the cards from the first station to the second and third stations for operating upon the first stack means and the feed means to obtain a transfer of the cards in the second station to the transport means for transport to the first station in each of such passes after the transfer of the cards from the first station to the second and third stations; and third control means operative upon each transfer of the cards in the plurality from the second station to the first station for operating upon the second stack means to obtain a transfer of the cards in the third station to the ransport means for transport to the first station after the return of the cards in the second stack to the first stack in that pass.

13. In apparatus for processing information cards, the combination of: first transport means for the cards; first, second and third stations each constructed to hold the cards in stacked relationship and to provide a transfer of cards into and out of the station; feed means disposed relative to the first station and the first transport means and constructed to provide a transfer of information cards to the periphery of the first transport means; first stack means disposed relative to the first station and the first transport means and constructed to provide a transfer of cards from the first transport means to the second station; second transport means for the cards; gate means disposed relative to the first and second transport means for obtaining a controlled transfer of cards between the first and second transport means; second stack means disposed relative to the second transport means and the third station for obtaining a controlled transfer of cards from the second transport means to the third station; means including transducing means disposed relative to the cards on the first transport means for processing first particular information on each individual one of the cards transferred to the first transport means; first control means responsive to the particular information processed by the processing means for operating upon the gate means to obtain a transfer of selected cards from the first transport means to the second transport means for movement to the third station in accordance with the information processed on each individual one of such cards and for obtaining a retention of the other cards on the first transport means past the position of transfer to the second transport means for a movement of the cards to the second station; and second control means responsive to the transfer of the cards from the first station to the second and third stations for operating upon the feed means and the first and second stack means and the gate means to obtain a transfer of the cards from the second and third stations to the first station upon the transfer of the cards from the first station to the second and third stations and in an order related to the information processed on the cards.

14. The combination set forth in claim 13, including, third control means responsive to the transfer of the cards from the second and third stations for obtaining an operation of the feed means and the first and second stack means to provide a second transfer of the cards from the first station to the second and third stations; and fourth control means responsive to the second transfer of the cards from the first station for controlling the operation of the transducing means to obtain the processing of second particular information on each individual one of the cards; and the gate means being constructed to obtain a transfer of the cards from each of the first and second transport means to the other one of the first and second transport means without interrupting the movements of the cards.

15. In a system for processing in a number of successive operational cycles a plurality of information cards individually identified by recorded data representing different binary information, the combination of: means including a first rotatable transport drum provided with a peripheral surface and constructed to hold the cards in fixed position on the peripheral surface of the drum during the drum rotation; first, second and third stations each constructed to hold the cards in stacked relationship; station means operative upon the cards and disposed relative to the first station and the first drum to obtain a transfer of the cards sequentially to the peripheral surface of the first drum from the first station; means including a second rotatable transport drum provided with a peripheral surface and constructed to hold the cards in fixed positioning on the peripheral surface of the drum during the drum rotation; means operatively coupled to the first and second drums for obtaining a rotation of the drums; means responsive to information of progressive digital significance on each individual one of the cards transferred to the first drum from the first station in successive cycles of operation for processing such information, for each individual one of the cards, gate means disposed between the first and second drums for obtaining a transfer of cards between the first and second drums, means responsive to the information processed in each cycle of operation for each individual one of the cards for obtaining an operation of the gate means to provide a transfer from the first drum to the second drum of the cards having particular binary information of a selected digital significance; first receiving means disposed relative to the second station and the cards on the first drum at the position past the transfer of the cards by the gate means to the second drum for obtaining a transfer into the second station of the cards other than those transferred to the second drum, second receiving means disposed relative to the cards on the second drum and to the third station for obtaining a transfer into the third station of the cards transferred to the second drum, the first and second receiving means being constructed to provide a respective transfer of cards from the second and third stations to the first and second drums and the station means being constructed to provide a transfer of cards from the first drum to the first station, means responsive to the transfer of the cards from the first station to the second and third stations for operating upon the first station means and the first receiving means to cause the cards from the second station to be returned successively to the first drum for transport to the first station in each cycle of operation, means responsive to the return of the cards from the second station to the first station for operating upon the second receiving means and the gate means to cause the cards in the third station to be successively returned to the second drum for transport to the first station in each cycle of operation; and means responsive to the transfer of the cards from the third station to the first station for initiating a new cycle of operation for processing each individual one of the cards.

16. In a system for processing in a number of successive operation cycles a plurality of information cards individually identified by recorded data representing different binary information, the combination of: means including a first rotatable vacuum transport drum constructed to hold the cards in fixed position on the drum during the drum rotation, a first card holder constructed to hold the cards in stacked relationship, a first transfer mechanism disposed relative to the first card holder and the first drum and operative in a first relationship to obtain the transfer of the cards to the first drum from the first card holder and operative in a second relationship to obtain a transfer of cards to the first card holder from the first drum, a second card holder constructed to hold the cards in the plurality in stacked relationship, means including transducing means disposed relative to the cards on the first drum for processing information on each individual one of the cards transported by the first drum and for processing information of progressive ordinal significance on each individual one of the cards in successive cycles of operation, a second transfer mechanism disposed relative to the second card holder and to the first drum and operative in a first relationship to obtain a transfer of cards to the first drum from the second card holder and operative in a second relationship to obtain a transfer of cards from the first drum to the second card holder, a second rotatable vacuum transport drum constructed to hold the cards in the plurality in fixed position on the second drum during the drum rotation, means operatively coupled to the first and second drums for obtaining a rotation of the drums, first gate means disposed relative to the cards on the first drum for successively selecting from the first drum in each cycle of operation cards having particular binary information of a selected ordinal significance in accordance with the information processed on each individual one of the cards and for obtaining a transfer of such cards to the second drum, a third card holder constructed to hold the cards in stacked relationship, a third transfer mechanism disposed relative to the third card holder and the second drum and operative in a first relationship for obtaining a transfer of cards to the second drum from the third card holder and operative in a second relationship to obtain a transfer of cards from the second drum to the third card holder, first control means responsive to the transfer of the cards from the first card holder to the second and third card holders for operating upon the second transfer mechanism and the first transfer mechanism to cause the cards deposited in the second card holder to be successively returned to the first drum for movement to the first card holder in each cycle of operation, second control means responsive to the return of the cards from the second card holder to the first card holder in accordance with the operation of the second control means for operating upon the third transfer mechanism to cause the cards deposited in the third card holder to be successively returned to the second drum, second gate means disposed relative to the cards transferred to the second drum from the third card holder for obtaining a transfer of such cards to the first drum for movement of the cards to the first card holder in each cycle of operation, and means responsive to the return of the cards from the third card holder to the first card holder for initiating a new cycle of operation for the processing of each individual one of the cards.

17. In apparatus for processing a plurality of information cards, the combination of: first transport means constructed to provide a movement of the cards, a first holder constructed to hold the information cards in stacked relationship, a first transfer mechanism disposed relative to the first card holder and to the first transport means and operative in a first relationship to obtain a transfer of cards in sequence to the first transport means from the first holder and operative in a second relationship to obtain a transfer of cards to the first holder from the first transport means, a second card holder constructed to hold the information storage cards in stacked relationship, a second transfer mechanism disposed relative to the second card holder and to the first transport means and operative in a first relationship to obtain a transfer of cards to the first transport means from the second holder and operative in a second relationship to obtain a transfer of cards from the first transport means to the second holder, second transport means constructed to provide a movement of the information cards, gate means disposed relative to the first and second transport means and constructed to obtain a transfer of cards between the first transport means and the second transport means before the movement of the cards from the first card holder to the second card holder, means including transducing means disposed relative to the cards on the first transport means for processing first particular information on each individual one of the cards transferred to the first transport means from the first station, control means operatively coupled to the gate means for causing the gate means to obtain a transfer of certain cards from the first transport means to the second transport means prior to the transportation of the cards to the second transfer mechanism and in accordance with the information processed on each individual one of the cards, a third card holder constructed to hold the information cards in stacked relationship, a third transfer mechanism disposed relative to the third card holder and to the second transport means and operative in a first relationship to obtain the transfer of cards to the second transport means from the third card holder and operative in a second relationship to obtain a transfer of cards from the second transport means to the third card holder, first control means responsive to the transfer of the cards from the first card holder for operating upon the second transfer mechanism to cause the cards deposited in the second card holder to be returned to the first transport means after the transfer of the cards in the first card holder to the second and third card holders, second control means responsive to the transfer of cards from the second card holder for operating upon the third transfer mechanism to obtain a transfer of the cards in the third card holder to the second transport means, and third control means operatively coupled to the gate means for causing the cards transferred to the second transport means from the third card holder to be returned to the first transport means, and fourth control means operatively coupled to the first transfer mechanism and responsive to the transfer of the cards from the first card holder for causing the cards returned to the first transport means from the second and third card holders to be transferred into the first card holder.

18. The combination set forth in claim 17 in which fifth control means are responsive to the transfer of the cards from the third card holder for operating upon the first, second and third transfer mechanisms and upon the gate means to obtain a transfer of the cards from the first card holder to the first transport means for movement to the second and third card holders and for operating upon the transducing means to obtain the processing of second particular information on the transported cards.

19. In apparatus for processing a plurality of information cards, the combination of: means including a first rotatable vacuum pressure transporting drum constructed to hold cards in fixed positioning on the drum during the drum rotation, a first holder positioned adjacent the first drum and constructed to hold information cards, a first transfer mechanism disposed relative to the first holder and to the first drum and operative in a first relationship to obtain a transfer of cards from the first holder to the first drum and operative in a second relationship to obtain a transfer of cards from the first drum to the first holder, a second card holder positioned adjacent the first transporting drum and constructed to hold information cards, a second transfer mechanism disposed adjacent to the second card holder and to the second drum and operative in a first relationship to obtain a transfer of cards to the first transporting drum from the second card holder and operative in a second relationship to obtain a transfer of cards to the second card holder from the first drum, means including a second vacuum pressure rotatable transporting drum positioned adjacent the first drum and constructed to hold cards in fixed positioning on the second drum during the rotation of the second drum, means operatively coupled to the first and second drums for obtaining a rotation of the drums, means including a first gate disposed between the first and second drums at a position adjacent to the first and second drums and prior to the transfer of the cards by the second transfer mechanism to the second drum for obtaining a transfer of cards from the first drum to the second drum, means including transducing means disposed relative to the cards on the first drum for processing first particular information on each individual one of the cards transferred to the first drum from the first card holder, first control means operatively coupled to the first gate for obtaining a transfer of particular cards from the first drum to the second drum prior to the transportation of the cards to the second transfer mechanism and in accordance with the information processed on each individual one of the cards, a third card holder positioned adjacent the second drum and constructed to hold information cards, a third transfer mechanism disposed adjacent to the third card holder and to the second drum and operative in a first relationship to obtain a transfer of cards to the second drum from the third card holder and operative in a second relationship to obtain a transfer of cards from the second drum to the third card holder, second control means responsive to the transfer of the cards from the first card holder for obtaining an operation of the second transfer mechanism in the first operative relationship to cause the cards in the second card holder to be returned to the first drum, third control means responsive to the transfer of the cards from the first card holder for obtaining an operation of the first transfer mechanism in the second operative relationship to cause the cards transferred to the first drum from the second card holder to be deposited in the first card holder, fourth control means responsive to the transfer of the cards from the second card holder for obtaining an operation of the third transfer mechanism in the second operative relationship to cause the cards in the third card holder to be returned to the second drum, means including a second gate disposed between the first and second drums for obtaining a transfer of cards from the second drum to the first drum, and fifth control means responsive to the transfer of the cards from the third card holder for obtaining an operation of the second gate means to cause the cards transferred from the third card holder to the second drum to be transferred to the first drum for movement to the first card holder.

20. The combination set forth in claim 19, including, sixth control means responsive to the transfer of the cards from the third card holder for obtaining an operation of the first transfer mechanism in the first operative relationship and an operation of the second and third transfer mechanisms in the second operative relationship to provide for a transfer of cards from the first card holder to the second and third card holders, and seventh control means responsive to the transfer of the cards from the third card holder for activating the transducing means to obtain the processing of second particular information on each individual one of the cards and a movement of the cards to the second and third card holders in accordance with such processed information on each particular one of the cards.

21. In apparatus for processing a plurality of information cards, the combination of: transport means for the cards, first, second and third card holders each constructed to hold the cards in stacked relationship, the first, second and third card holders being disposed with the second card holder between the first and third card holders in the direction of movement of the cards to the first card holder from the third card holder, a first transfer mechanism disposed relative to the transport means and the first card holder and operative in a first relationship to obtain a transfer of cards to the transport means from the first card holder and operative in a second relationship to obtain a transfer of cards from the transport means to the third card holder, a second transfer mechanism disposed relative to the transport means and the second card holder and operative in a first relationship to obtain a transfer of cards from the second card holder to the transport means and operative in a second relationship to obtain a transfer of cards from the transport means to the second card holder, the second transfer mechanism being disposed relative to the transport means in the first operative relationship to provide for a transport of cards from the third card holder to the first card holder, a third transfer mechanism disposed relative to the transport means and the third card holder and operative in a first relationship to obtain a transfer of cards from the third card holder to the transport means and operative in a second relationship to obtain a transfer of cards to the third card holder from the transport means, means responsive to particular information on each particular one of the cards for obtaining an operation of the first transfer mechanism in the first relationship and the second and third transfer mechanisms in the second relationship in accordance with the information on each individual one of the cards to provide a transfer of cards from the first card holder to the second and third card holders, means operatively coupled to the second transfer mechanism and the first transfer mechanism and responsive to the transfer of cards from the first card holder for obtaining an operation of the second transfer mechanism in the first relationship and an operation of the first transfer mechanism in the second relationship to provide a transfer of cards from the second card holder to the transport means for movement to the first card holder, and means responsive to the transfer of the cards from the second card holder for obtaining an operation of the third transfer mechanism in the first relationship to obtain a transfer of the cards in the third card holder to the transport means for movement to the first card holder.

22. In apparatus for processing a plurality of information cards, the combination of: transport means constructed to obtain a movement of the cards in a closed loop, first, second and third card holders each constructed to hold the cards in stacked relationship, the first, second and third card holders being disposed on a progressive basis in the direction of transport of the cards, a first transfer mechanism disposed relative to the transport means and the first card holder and operative in a first relationship to obtain a transfer of cards to the transport means from the first card holder and operative in a second relationship to obtain a transfer of cards from the transport means to the second card holder, a second transfer mechanism disposed relative to the transport means and the second card holder and operative in a first relationship to obtain a transfer of cards to the transport means from the second card holder and operative in a second relationship to obtain a transfer of cards to the second card holder from the second transport means, the transfer mechanism being disposed in spaced relationship to the transport means in the first operative relationship to provide for a movement of cards from the first card holder past the second transfer mechanism to the third card holder, a third transfer mechanism disposed relative to the transport means and the third card holder and operative in a first relationship to obtain a transfer of cards to the transport means from the third card holder and operative in a second relationship to obtain a transfer of cards from the transport means to the third card holder, first control means responsive to particular information on each individual one of the cards for initially obtaining an operation of the first transfer mechanism in the first relationship and an operation of the second and third transfer mechanisms in the second relationship in accordance with the information on each individual one of the cards to provide for a transfer of cards from the first card holder to the second and third card holders, second control means responsive to the transfer of cards from the first card holder for obtaining an operation of the second transfer mechanism in the first relationship and an operation of the first transfer mechanism in the second relationship to obtain a transfer of cards from the second card holder to the first card holder, and third control means responsive to the transfer of the cards from the first card holder for obtaining an operation of the third transfer mechanism in the first relationship to obtain a transfer of cards from the third card holder to the first card holder.

23. The combination set forth in claim 22 in which the transport means includes a rotatable drum constructed to produce a vacuum at the periphery of the drum for holding the cards in fixed position on the periphery of the drum during the drum rotation and in which means are operatively coupled to the drum for producing the vacuum at the periphery of the drum.

References Cited in the file of this patent

UNITED STATES PATENTS

| | | |
|---|---|---|
| 2,795,328 | Tyler | June 11, 1957 |
| 2,883,189 | Wilson | Apr. 21, 1959 |
| 2,905,466 | Azari | Sept. 22, 1959 |
| 2,965,291 | Hayes | Dec. 20, 1960 |

FOREIGN PATENTS

| | | |
|---|---|---|
| 792,109 | Great Britain | Mar. 19, 1958 |
| 1,109,452 | France | Sept. 28, 1955 |